ations cited

(12) United States Patent
Mallina et al.

(10) Patent No.: US 10,539,154 B2
(45) Date of Patent: Jan. 21, 2020

(54) COMPRESSOR END-WALL TREATMENT HAVING A BENT PROFILE

(71) Applicant: General Electric Company, Schenectady, NY (US)

(72) Inventors: Ramakrishna Venkata Mallina, Clifton Park, NY (US); Sungho Yoon, Munich (DE); Vittorio Michelassi, Munich (DE); Ivan Malcevic, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 15/531,992

(22) PCT Filed: Dec. 10, 2014

(86) PCT No.: PCT/US2014/069433
§ 371 (c)(1),
(2) Date: May 31, 2017

(87) PCT Pub. No.: WO2016/093811
PCT Pub. Date: Jun. 16, 2016

(65) Prior Publication Data
US 2017/0328377 A1    Nov. 16, 2017

(51) Int. Cl.
*F04D 29/52* (2006.01)
*F02C 3/04* (2006.01)
(Continued)

(52) U.S. Cl.
CPC ........... *F04D 29/526* (2013.01); *F01D 5/145* (2013.01); *F01D 11/08* (2013.01); *F02C 3/04* (2013.01);
(Continued)

(58) Field of Classification Search
CPC . F02C 3/04; F01D 5/145; F01D 11/08; F04D 29/324; F04D 29/526;
(Continued)

(56) References Cited

U.S. PATENT DOCUMENTS

| 4,164,845 A | 8/1979 | Exley et al. |
| 4,315,714 A | 2/1982 | Exley et al. |

(Continued)

FOREIGN PATENT DOCUMENTS

| CN | 201176968 Y | 1/2009 |
| CN | 101451544 A | 6/2009 |

(Continued)

OTHER PUBLICATIONS

Houghton, T., and Day, I., "Stability Enhancement by Casing Grooves: The Importance of Stall Inception Mechanism and Solidity," Journal of Turbomachinery, vol. 134, Issue 2, pp. 021003-1-021003-8 (Jun. 21, 2011).

(Continued)

*Primary Examiner* — Igor Kershteyn
(74) *Attorney, Agent, or Firm* — Frank A. Landgraff; Charlotte C. Wilson; James W. Pemrick

(57) ABSTRACT

A compressor is provided including a compressor end-wall having a casing and a hub. The compressor further includes at least one set of rotor blades, one set of stator blades, and a plurality of end-wall treatments spaced apart from each other, formed in an interior surface of at least one of the casing and hub, and facing a tip of the rotor blade or stator blade. Each end-wall treatment includes a forward recess portion extending along a first axis and an aft recess portion extending along a second axis different than the first axis. The aft recess portion is joined to the corresponding forward recess portion via an intersection portion which is inclined relative to at least one of the first axis, and the second axis.

(Continued)

The aft recess portion and/or the forward recess portion are bent from the intersection portion and inclined relative to an axial direction of the compressor.

26 Claims, 17 Drawing Sheets

(51) Int. Cl.
   *F04D 29/32* (2006.01)
   *F04D 29/54* (2006.01)
   *F01D 5/14* (2006.01)
   *F01D 11/08* (2006.01)
   *F04D 29/68* (2006.01)

(52) U.S. Cl.
   CPC ......... *F04D 29/324* (2013.01); *F04D 29/542* (2013.01); *F04D 29/685* (2013.01); *Y02T 50/673* (2013.01)

(58) Field of Classification Search
   CPC .. F04D 29/542; F04D 29/685; F05D 2220/32; Y02T 50/673
   See application file for complete search history.

(56) References Cited

U.S. PATENT DOCUMENTS

| | | | |
|---|---|---|---|
| 4,368,005 A | 1/1983 | Exley et al. | |
| 5,137,419 A | 8/1992 | Waterman | |
| 5,762,470 A * | 6/1998 | Gelmedov | F04D 29/4213 415/119 |
| 6,290,458 B1 | 9/2001 | Irie et al. | |
| 6,302,643 B1 | 10/2001 | Kurokawa et al. | |
| 6,527,509 B2 * | 3/2003 | Kurokawa | F01D 5/145 415/173.1 |
| 6,540,482 B2 * | 4/2003 | Irie | F04D 29/4273 415/119 |
| 7,396,208 B1 | 7/2008 | Hussain | |
| 7,575,412 B2 * | 8/2009 | Seitz | F01D 5/145 415/58.5 |
| 7,861,823 B2 * | 1/2011 | Prasad | B64D 33/02 181/210 |
| 8,251,648 B2 | 8/2012 | Johann | |
| 8,262,340 B2 * | 9/2012 | Guemmer | F01D 5/145 415/144 |
| 8,382,422 B2 * | 2/2013 | Guemmer | F04D 29/526 415/58.5 |
| 8,678,757 B2 | 3/2014 | Li | |
| 8,702,398 B2 | 4/2014 | Breeze-Stringfellow et al. | |
| 8,915,699 B2 | 12/2014 | Brignole et al. | |
| 2010/0014956 A1 * | 1/2010 | Guemmer | F04D 29/526 415/9 |
| 2010/0310353 A1 | 12/2010 | Yu | |
| 2010/0329852 A1 * | 12/2010 | Brignole | F04D 29/526 415/159 |
| 2013/0017066 A1 | 1/2013 | Nolcheff et al. | |

FOREIGN PATENT DOCUMENTS

| | | |
|---|---|---|
| DE | 10 2008 010 283 A1 | 8/2009 |
| EP | 2 143 956 A2 | 1/2010 |
| KR | 10-1195181 B1 | 10/2012 |

OTHER PUBLICATIONS

Lu, X., et. al., "Experimental and Numerical Investigation of a Subsonic Compressor with Bend Skewed Slot Casing Treatment," ASME Turbo Expo 2006: Power for Land, Sea, and Air, vol. 6: Turbomachinery, Parts A and B, pp. 1-11 (May 8-11, 2006).

Strazisar, A. J., et al., "Compressor Stall Control Through Endwall Recirculation," ASME Turbo Expo 2004: Power for Land, Sea, and Air, vol. 5, Parts A and B, pp. 1-13 (Jun. 14-17, 2004).

Wuli, C., et al., "Experimental Research and Analysis of Sloped Slotted Casing Treatment," Journal of Aerospace Power, vol. 14, No. 3, pp. 270-274 (Jul. 1999) (Abstract).

Xin-Gen, L., et al., "Mechanism of axial-flow compressor stall margin improvement associated with bend skewed slots casing treatment," Journal of Propulsion Technology, vol. 27, Issue 6, pp. 505-509 (Dec. 2006) (Abstract).

Yandong, Z., and Yajun, L., "An Experimental Investigation on Arc Skewed Slot Casing Treatment," Journal of Aerospace Power, vol. 13, No. 3, pp. 254-258 (Jul. 1998) (Abstract).

International Search Report and Written Opinion issued in connection with corresponding PCT Application No. PCT/US2014/069433 dated Feb. 5, 2016.

International Preliminary Report on Patentability issued in connection with corresponding PCT Application No. PCT/US2014/069433 dated Jun. 13, 2017.

* cited by examiner

Forward looking aft

COMPRESSOR END-WALL TREATMENT HAVING A BENT PROFILE

BACKGROUND

The present invention relates to a compressor, and more particularly to a plurality of end-wall treatments disposed in a casing and/or a hub of such compressor.

Compressors used in engines such as a gas turbine, may include a plurality of stages arranged along a length of the compressor. Each stage may include a hub and a plurality of rotor blades arranged about a circumference of the hub. In addition, each stage may further include a plurality of stator blades, disposed alternately to the plurality of rotor blades and arranged about a circumference of a casing of the compressor.

During operation of such gas turbine, the hub of the compressor may be rotated at high speed by a turbine, such that a fluid is continuously induced into the compressor. The fluid is accelerated by the rotating rotor blades and swept rearwards onto the adjacent rows of the stator blades. At each stage, the rotor blade and/or stator blade increases pressure of the fluid. In addition, during operation of the compressor, a portion of the fluid may flow about a tip of each rotor blade and/or stator blade as a leakage flow. Such stage-to-stage leakage of compressed fluid as the leakage flow affects the stable operating range of the compressor and adversely affects the efficiency of the gas turbine. The point at which the compressor starts operating in an unstable condition may be referred to as the stall point of the compressor.

The operating range of the compressor is generally limited due to weak flow at the tip of the blade. Prior attempts to increase the operating range and improve the stall margin have included flow control based techniques such as plasma actuation and suction/blowing near a blade tip. However, such attempts may significantly increase complexity and weight of the compressor. Other attempts include end-wall treatments such as circumferential grooves, axial grooves, and the like. Early attempts on such end-wall treatments have a substantial impact on design point efficiency with very minimal benefit in improving the stall margin of the compressor.

Thus, there is a need for an improved end-wall treatment for a compressor and an associated method for controlling a leakage flow about one or more blade tips and thereby improving a stall margin of the compressor.

BRIEF DESCRIPTION OF THE DISCLOSURE

In one embodiment, a compressor includes a compressor end-wall defining a flow passage, and including a casing and a hub disposed concentrically about and coaxially along a longitudinal axis. The compressor further includes at least one set of rotor blades, each of the at least one set of rotor blades including a plurality of rotor blades coupled to the hub and extending between the hub and the casing and defining a blade passage there between each of the rotor blades. Further, the compressor includes at least one set of stator blades, each of the at least one set of stator blades including a plurality of stator blades coupled to the casing and extending between the casing and the hub and defining a blade passage there between each of the stator blades. The compressor further includes a plurality of end-wall treatments spaced apart from each other and formed in an interior surface of at least one of the casing and the hub, wherein each end-wall treatment faces a tip of the rotor blade or the stator blade. Each end-wall treatment includes a forward recess portion extending along a first axis to maintain a fluid flow substantially straight through the forward recess portion, and an aft recess portion extending along a second axis different than the first axis to maintain the fluid flow substantially straight through the aft recess portion. The aft recess portion is joined to the corresponding forward recess portion via an intersection portion which may be inclined relative to at least one of the first axis and the second axis. The aft recess portion and/or the forward recess portion are bent from the intersection portion and inclined relative to an axial direction of the compressor. The aft and forward recess portions include an axial lean inclined relative to at least one of the axial direction of the compressor, the first axis, and the second axis, and a circumferential lean inclined relative to a circumferential direction of the compressor.

In another embodiment, an engine includes a compressor, a combustor, and a turbine. Such compressor, combustor, and turbine are configured in a downstream axial flow relationship. The compressor includes a compressor end-wall defining a flow passage, and including a casing and a hub disposed concentrically about and coaxially along a longitudinal axis. The compressor further includes at least one set of rotor blades, each of the at least one set of rotor blades including a plurality of rotor blades coupled to the hub and extending between the hub and the casing and defining a blade passage there between each of the rotor blades. Further, the compressor includes at least one set of stator blades, each of the at least one set of stator blades including a plurality of stator blades coupled to the casing and extending between the casing and the hub and defining a blade passage there between each of the stator blades. The compressor further includes a plurality of end-wall treatments spaced apart from each other and formed in an interior surface of at least one of the casing and the hub, wherein each end-wall treatment faces a tip of the rotor blade or the stator blade. Each end-wall treatment includes a forward recess portion extending along a first axis to maintain a fluid flow substantially straight through the forward recess portion, and an aft recess portion extending along a second axis different than the first axis to maintain the fluid flow substantially straight through the aft recess portion. The aft recess portion is joined to the corresponding forward recess portion via an intersection portion which may be inclined relative to at least one of the first axis and the second axis. The aft recess portion and/or the forward recess portion are bent from the intersection portion and inclined relative to an axial direction of the compressor. The aft and forward recess portions include an axial lean inclined relative to at least one of the axial direction of the compressor, the first axis, and the second axis, and a circumferential lean inclined relative to a circumferential direction of the compressor.

In one embodiment, a method includes introducing a fluid flow along a flow passage defined by a compressor end-wall of the compressor. The compressor end-wall including a casing and a hub disposed concentrically about and coaxially along a longitudinal axis. The method further includes extracting a portion of the fluid flow into an end-wall treatment among the plurality of end-wall treatments which is spaced apart from each other and formed in an interior surface of at least one of the casing and the hub. In such embodiment, each end-wall treatment includes a forward recess portion extending along a first axis and an aft recess portion extending along a second axis different than the first axis. The aft recess portion is joined to the corresponding forward recess portion via an intersection portion which may be inclined relative to at least one of the first axis, and the second axis. The aft recess portion and/or the forward recess portion are bent from the intersection portion and inclined relative to an axial direction of the compressor. The aft and forward recess portions include an axial lean inclined relative to at least one of the axial direction of the compressor, the first axis, and the second axis, and a circumferential lean inclined relative to a circumferential direction of the compressor. The method further includes flowing the portion of the fluid flow along the first axis to maintain a fluid flow substantially straight through the forward recess portion, and along the second axis to maintain the fluid flow substantially straight through the aft recess portion.

DRAWINGS

These and other features and aspects of embodiments of the present technology will become better understood when the following detailed description is read with reference to the accompanying drawings in which like characters represent like parts throughout the drawings, wherein.

DETAILED DESCRIPTION

Embodiments discussed herein disclose an improved compressor for deployment in engines such as a gas turbine, a steam turbine, and the like. The compressor may be an axial flow compressor and according to one embodiment such compressor includes a plurality of end-wall treatments which is configured to reduce a leakage flow and improve a stall margin with minimal penalty on design point efficiency of the compressor. In one embodiment of the present invention, the compressor includes a plurality of end-wall treatments which is spaced apart from each other and formed in an interior surface of at least one of a casing and a hub. Each end-wall treatment faces a tip of a blade among a plurality of rotor or stator blades which are positioned in a flow passage defined by a compressor end-wall. The plurality of rotor and stator blades are coupled to the hub and casing. The tip of each blade among the plurality of rotor and stator blades, and each end-wall treatment are configured to move relative to each other. Each end-wall treatment includes a forward recess portion extending along a first axis and an aft recess portion extending along a second axis different than the first axis. The forward recess portion is joined to the corresponding aft recess portion via an intersection portion which is inclined relative to at least one of the first axis, and the second axis. The forward recess portion and/or the aft recess portion are bent from the intersection portion and inclined relative to an axial direction of the compressor.

Figure 1:
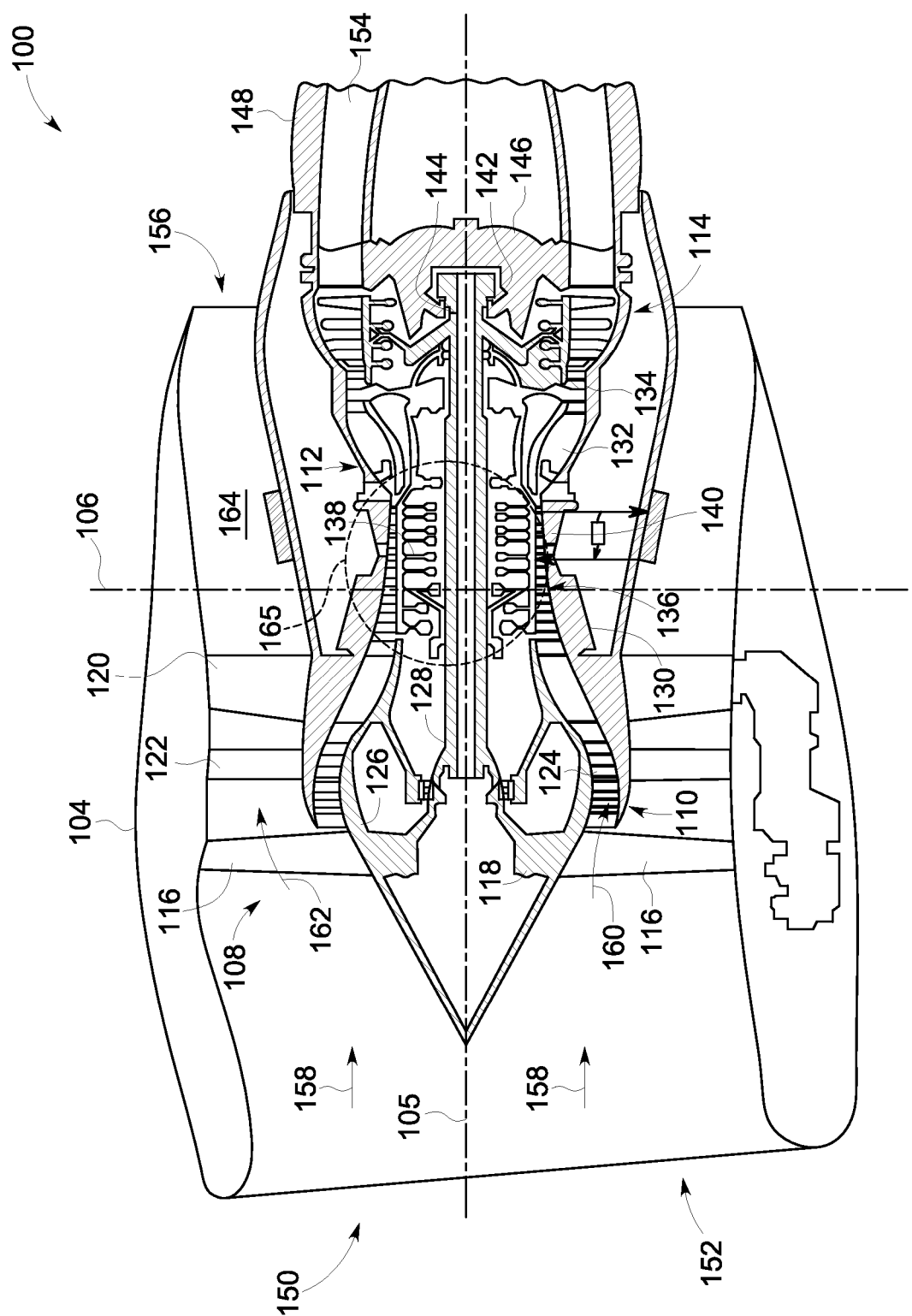
FIG. 1 is a schematic cross-sectional view of a portion of an engine assembly including a compressor in accordance with one or more embodiments shown or described herein.

Referring to the drawings wherein identical reference numerals denote the same elements throughout the various views, FIG. 1 depict a schematic illustration of an exemplary engine assembly 100, for example an aircraft engine assembly. The engine assembly 100 has a longitudinal axis 105 and an outer stationary annular fan casing 104 disposed concentrically about and coaxially along the longitudinal axis 105. In addition, the engine assembly 100 has a radial axis 106. In one exemplary embodiment, the engine assembly 100 includes a fan assembly 108, a booster compressor 110, an engine 112, and a low-pressure turbine 114 that may be coupled to the fan assembly 108 and the booster compressor 110.

The fan assembly 108 includes a plurality of rotor fan blades 116 that extend substantially radially outward from a fan rotor disk 118 and outlet guide blades (OGVs) 120 for providing aerodynamic function, positioned downstream of the rotor fan blades 116. Further, the fan assembly 108 includes a plurality of structural strut members 122 for providing structural support. In this example, separate members are used for providing the aerodynamic function and structural support to the outer stationary annular fan casing 104. In other configurations, the OGVs 120 may provide both aerodynamic function and structural support for the outer stationary annular fan casing 104. The booster compressor 110 includes a plurality of rotor blades 124 that extend substantially radially outward from a compressor rotor disk or hub 126 coupled to a first drive shaft 128. The engine 112 includes a compressor 130, a combustor 132, and a turbine 134. In the illustrated embodiment, the compressor 130, the combustor 132, and the turbine 134 are configured in a downstream axial flow relationship. The compressor 130 includes a flow passage (not labeled in FIG. 1) defined by a compressor end-wall (not labeled in FIG. 1) including a hub 138 and a casing 140 which are disposed concentrically about and coaxially along a longitudinal axis 105. In one embodiment, the flow passage is cylindrical. In some other embodiments, the flow passage may be conical, complex curved shapes, and the like. The compressor 130 includes a plurality of blades 136 positioned in the flow passage, particularly, coupled to the hub 138 and the casing 140. The plurality of blades 136 may include at least one set of rotor blades (not shown in FIG. 1) that may extend substantially radially outward from the hub 138, and at least one set of stator blades (not shown in FIG. 1) that may extend substantially radially inward from the casing 140. In one embodiment, each stator blade may be integral part of the casing 140 or may be coupled to the casing 140 via a suitable coupling means such as a cantilever, a hook, and the like. In one or more embodiments, the compressor 130 disposed upstream relative to the combustor 132, includes a plurality of end-wall treatments (not shown in FIG. 1) represented by a dotted circle 165, formed in at least one of the casing 140 and the hub 138. In some other embodiments, the plurality of end-wall treatments may be disposed in the booster compressor 110, the fan assembly 108 and the like without deviating from the scope of the present invention. As illustrated in the embodiment of FIG. 1, the compressor 130 may be used in the aircraft engine. In certain other embodiments, the compressor 130 may be used in power generation applications, power and water industries, oil and gas refining industries, and oil and gas production industries without deviating from the scope of the present invention. In the illustrated embodiment, the compressor 130 is an axial flow compressor. In one or more embodiments, suitable compressor 130 may include a centrifugal compressor (radial compressor), a reciprocating compressor, a screw compressor, a rotary compressor, a fan, and the like. The end-wall treatment 190 illustrated herein may be used in any such suitable compressor without deviating from the scope of the present invention. The compressor 130 is explained in greater detail below.

In the illustrated embodiment, the compressor 130 and the turbine 134 are coupled together by a second drive shaft 142. The first and second drive shafts 128 and 142 are rotatably mounted on bearings 144 which are mounted in a fan frame 146 and a turbine rear frame 148. The engine assembly 100 also includes an intake side 150, defining a fan intake 152, an exhaust side 154, and a fan exhaust side 156.

During operation of the engine assembly 100, the fan assembly 108 compresses a fluid flow 158 entering the engine assembly 100 through the intake side 150. The fluid flow 158 exiting the fan assembly 108 is split such that a first portion 160 of the fluid flow 158 is channeled into the booster compressor 110, as a compressed fluid flow, and a second portion 162 of the fluid flow 158 bypasses the booster compressor 110 and the engine 112, and exits the engine assembly 100 via a bypass duct 164, through the fan exhaust side 156 as a bypass fluid flow. The plurality of rotor fan blades 124 is configured to compress and deliver the first portion 160 towards the engine 112. Furthermore, the compressed first portion 160 (i.e. fluid flow) is further compressed by the compressor 130 and is delivered to the downstream combustor 132. Moreover, the fluid flow 160 from the combustor 132 drives the rotating turbine 134 and the low-pressure turbine 114 and exits the engine assembly 100 through the engine exhaust side 146.

Figure 2:
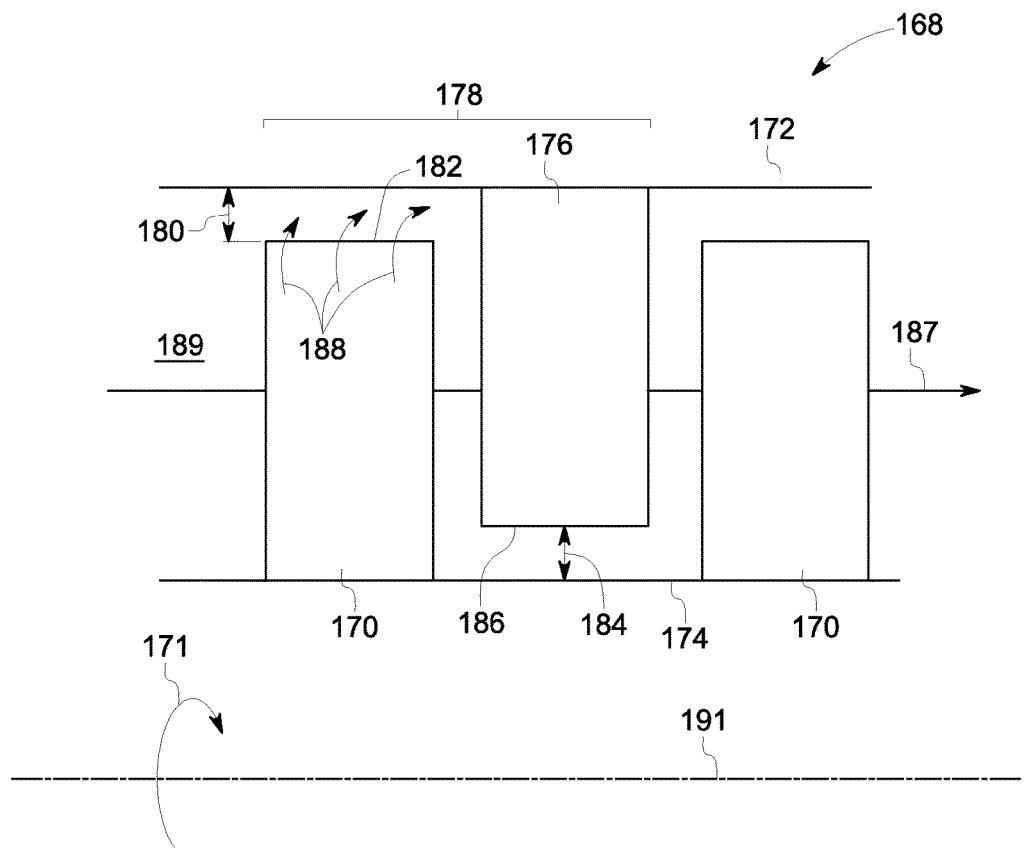
FIG. 2 is a schematic cross-sectional view of a portion of a compressor as known in art.

Referring now to FIG. 2, illustrated schematically is a portion 168 of a conventional compressor, as generally known in the art and labeled as "Prior Art". The portion 168 of the compressor includes a plurality of rotor blades 170 and a plurality of stator blades 176 (of which only a single stator blade is shown). Each rotor blade among the plurality of rotor blades 170 is circumferentially spaced around a compressor hub 174 and extends primarily in a radially outward direction (not labeled in FIG. 2) towards a compressor casing 172 from the compressor hub 174. Similarly, each stator blade among the plurality of stator blades 176 is circumferentially spaced around the compressor casing 172 and extends primarily in a radially inward direction (not labeled in FIG. 2) to interface with the compressor hub 174. Each stator blade 176 is positioned adjacent to each rotor blade 170, and in combination form one of a plurality of stages 178 (of which only a single stage is shown). The plurality of rotor blades 170 is circumscribed by the compressor casing 172, such that an annular gap 180 is defined between the compressor casing 172 and a tip 182 of each rotor blade 170. Likewise, the plurality of stator blades 176 is disposed relative to the compressor hub 174 such that an annular gap 184 is defined between the compressor hub 174 and a tip 186 of each stator blade 176.

During operation of such conventional compressor, fluid 187 flows along a flow path 189 as the rotor blades 170 rotates 171 along an axis 191. A stable operating range of such compressor is generally limited due to a leakage flow, as indicated by directional arrows 188, proximate to the tip 182 of each rotor blade 170. In addition, a leakage flow (not shown in FIG. 2) may appear proximate to the tip 186 of each stator blade 176. Such leakage flow 188 at the tip 182, 186 of the rotor and stator blades respectively may also affect a stall point of the compressor. To increase the operating range, conventional compressors have included flow-control systems (not shown in FIG. 2) such as plasma actuators, suction/blowing near the tip 182 of the rotor blades 170, in an attempt to provide an increase in the operating range by redirecting and/or minimizing leakage flow 188 and thereby improving the stall point/margin of the compressor.

Figure 3:
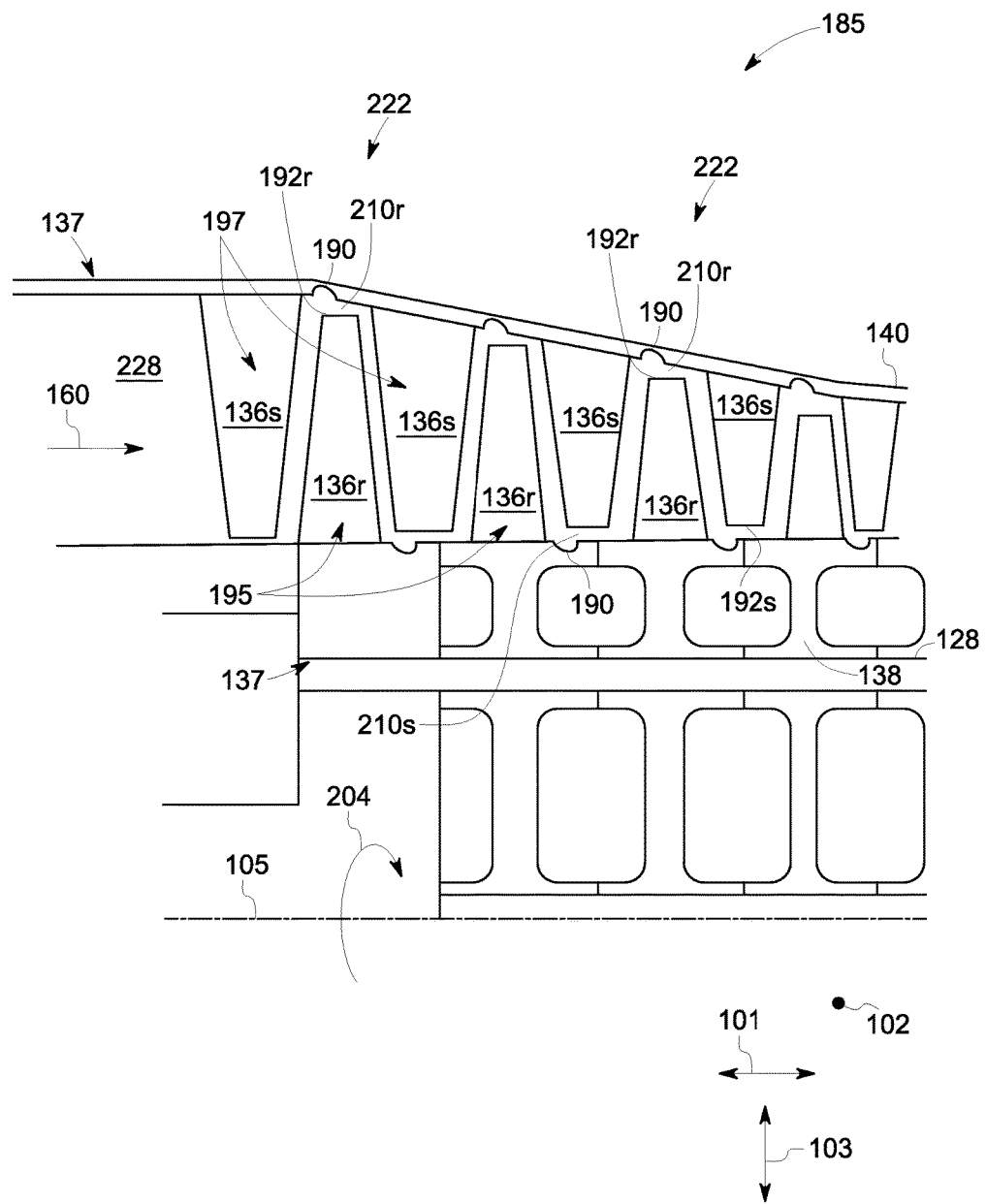
FIG. 3 is a schematic cross-section of a portion of the compressor of the aircraft engine of FIG. 1, including a plurality of end-wall treatments, in accordance with one or more embodiments shown or described herein.

Referring more specifically to FIG. 3, illustrated is a portion 185 of the novel compressor 130, as presented in FIG. 1. In the illustrated embodiment, an axial direction of the compressor 130 is represented by reference numeral 101, a circumferential direction of the compressor 130 is represented by reference numeral 102, and a radial direction of the compressor 130 is represented by reference numeral 103. As illustrated, in the exemplary embodiment, the aircraft engine assembly 100, and more particularly the compressor 130 includes at least one set of rotor blades 195 and at least one set of stator blades 197. Each of the at least one set of rotor blades 195 includes a plurality of rotor blades 136r that are circumferentially spaced and extend radially outward towards the casing 140 from the hub 138 and coupled to the first drive shaft 128. Further, each of the at least one set of stator blades 197 includes a plurality of stator blades 136s positioned adjacent to each set of rotor blades 195, and in combination form one of a plurality of stages 222. Each stator blade 136s is circumferentially spaced and securely coupled to the casing 140 and extends radially inward to interface with the hub 138. Each of the plurality of stages 222 directs a flow of compressed fluid 160 through the compressor 130. Each rotor blade 136r is circumscribed by the casing 140, such that an annular gap 210r is defined between the casing 140 and a tip 192r of each rotor blade 136r. Likewise, each stator blade 136s is disposed relative to the hub 140, such that an annular gap 210s is defined between the hub 138 and a tip 192s of each stator blade 136s.

As is typical in the art, the gaps 210r and 210s are sized to facilitate minimizing a quantity of compressed fluid 160 that bypasses each rotor blade 136r and stator blade 136s respectively, defining the leakage flow 188 (as shown in FIG. 2). To provide for recirculation of that portion (i.e. leakage flow) of compressed fluid 160 proximate to the tips 192r, 192s of the rotor and stator blades 136r, 136s respectively, the novel compressor 130 having a plurality of end-wall treatments 190 is disclosed in one embodiment of the present invention. As used herein, the term "end-wall" is intended to encompass the casing 140 and/or the hub 138 of a compressor end-wall 137 which defines a flow passage 228 of the compressor 130. Such plurality of end-wall treatments 190 formed in the at least one of the casing 140 and the hub 138 (i.e. compressor end-wall) are explained in greater details below.

Figure 4:
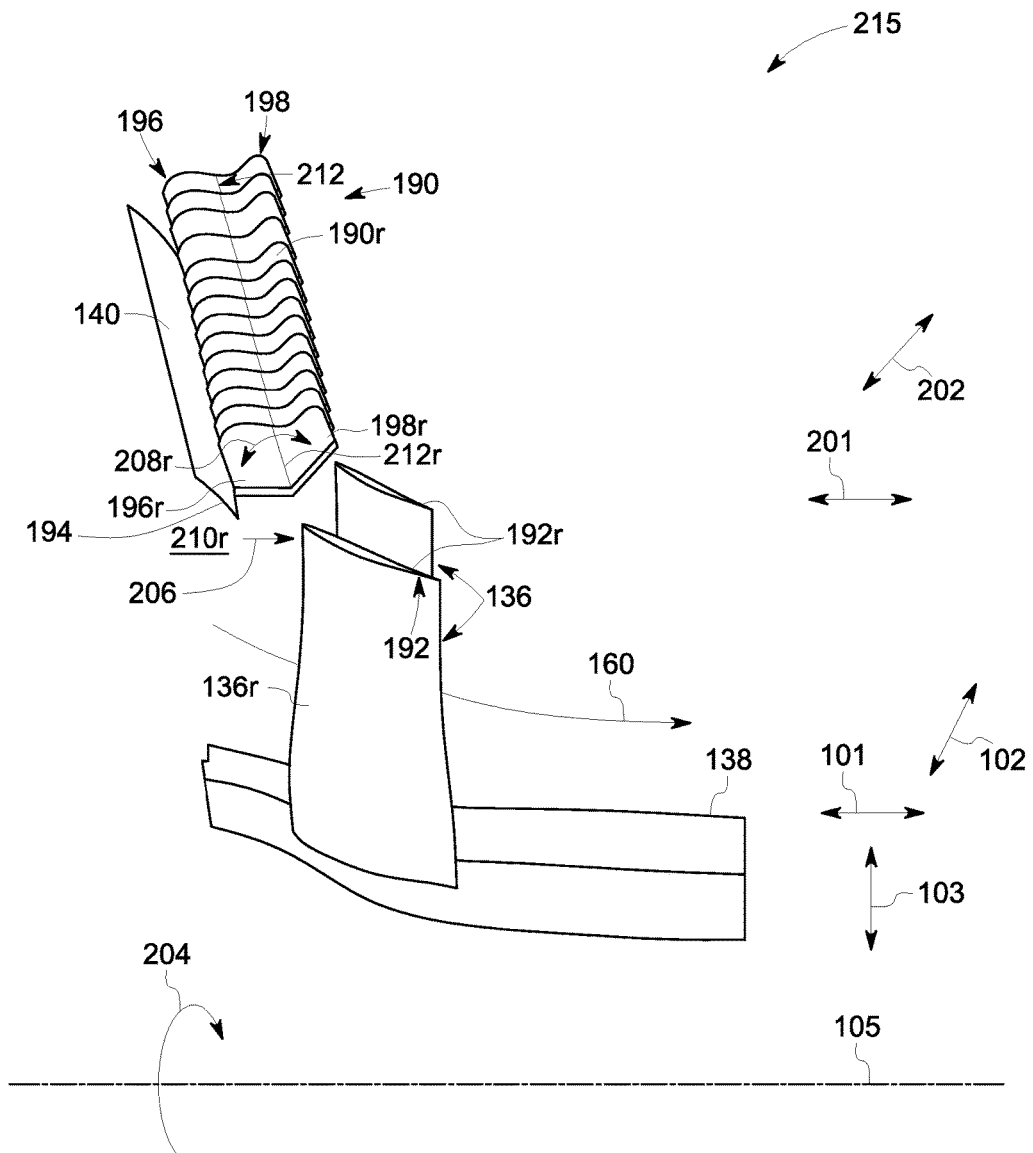
FIG. 4 is an isometric view of a portion of a compressor including a plurality of end-wall treatments formed in a casing of a compressor in accordance with one exemplary embodiment.

FIG. 4 illustrates an isometric view of a portion 215 of the compressor 130 having the plurality of end-wall treatments 190 formed in the casing 140 in accordance to one exemplary embodiment of the present invention. The plurality of end-wall treatments 190 may be formed in the hub 138 of the compressor 130, which is explained in greater detail with respect to FIG. 5. The plurality of end-wall treatments 190 formed in the hub 138 and the casing 140 of the compressor 130 includes a forward recess portion 196, an aft recess portion 198, and an intersection portion 212. In one embodiment, the plurality of end-wall treatments 190 spaced apart from each other may be formed continuously at all stages 222 (as shown in FIG. 3) in the casing 140 and hub 138. In some other embodiments, the plurality of end-wall treatments 190 may be formed selectively at one or more stages 222 of the compressor 130. In the illustrated embodiment, the plurality of end-wall treatments 190 is equally spaced (not labeled in FIG. 4) apart from each other. In another embodiment, the plurality of end-wall treatments 190 is not equally spaced apart from each other which are explained in greater detail in the embodiment illustrated with respect to FIG. 15.

In one embodiment, the plurality of end-wall treatments 190 faces a tip 192 of each blade 136. The plurality of end-wall treatments 190 is spaced apart from each other, formed into an interior surface 194 of the casing 140 and disposed circumferentially thereabout proximate to the tip 192 of the plurality of rotor blades 136r. Specifically, each end-wall treatment 190r faces the tip 192r of each rotor blade 136r. Each end-wall treatment 190r includes a forward recess portion 196r, an aft recess portion 198r, and an intersection portion 212r joining the forward recess portion 196r to the aft recess portion 198r. Further, in the illustrated embodiment of FIG. 4, the aft recess portion 198r is bent from the intersection portion 212r and inclined relative to an axial direction 101 of the compressor 130. In this particular embodiment, the forward recess portion 196r extends along a first axis 201 and the aft recess portion 198r extends along a second axis 202 different than the first axis 201. In the illustrated embodiment, the first axis 201 is along the axial direction 101 of the compressor 130 and the second axis 202 is inclined away from the first axis 201 such that it has a directional component along a rotation 204 of the tip 192r of each rotor blade 136r. The intersection portion 212r joining the forward recess portion 196r to the aft recess portion 198r is explained in greater detail below.

During operation of the compressor 130, the tip 192r of each rotor blade 136r and each end-wall treatment 190r are configured to move relative to each other. Specifically, the hub 138 is configured to rotate 204 about the axial direction 101 so that a fluid flow 160 is generally along the principal direction (i.e. the longitudinal axis 105) of the engine assembly 100. Further, a portion 206 of the fluid 160 located at the tip 192r of each rotor blade 136r is recirculated as represented by reference numeral 208r via the recess portions 196r, 198r into the gap 210r formed between the tip 192r of each rotor blade 136r and each end-wall treatment 190r. This recirculation 208r of the fluid 160 effectively extracts low momentum flow (i.e. portion 206) present near the tip 192r of each rotor blade 136r, energizes the portion 206 of the fluid 160, and returns the energized flow (i.e. portion 206) into the gap 210r near each rotor blade 136r. The recirculation 208r of the portion 206 of the fluid 160 will be explained in a greater detail below.

Figure 5:
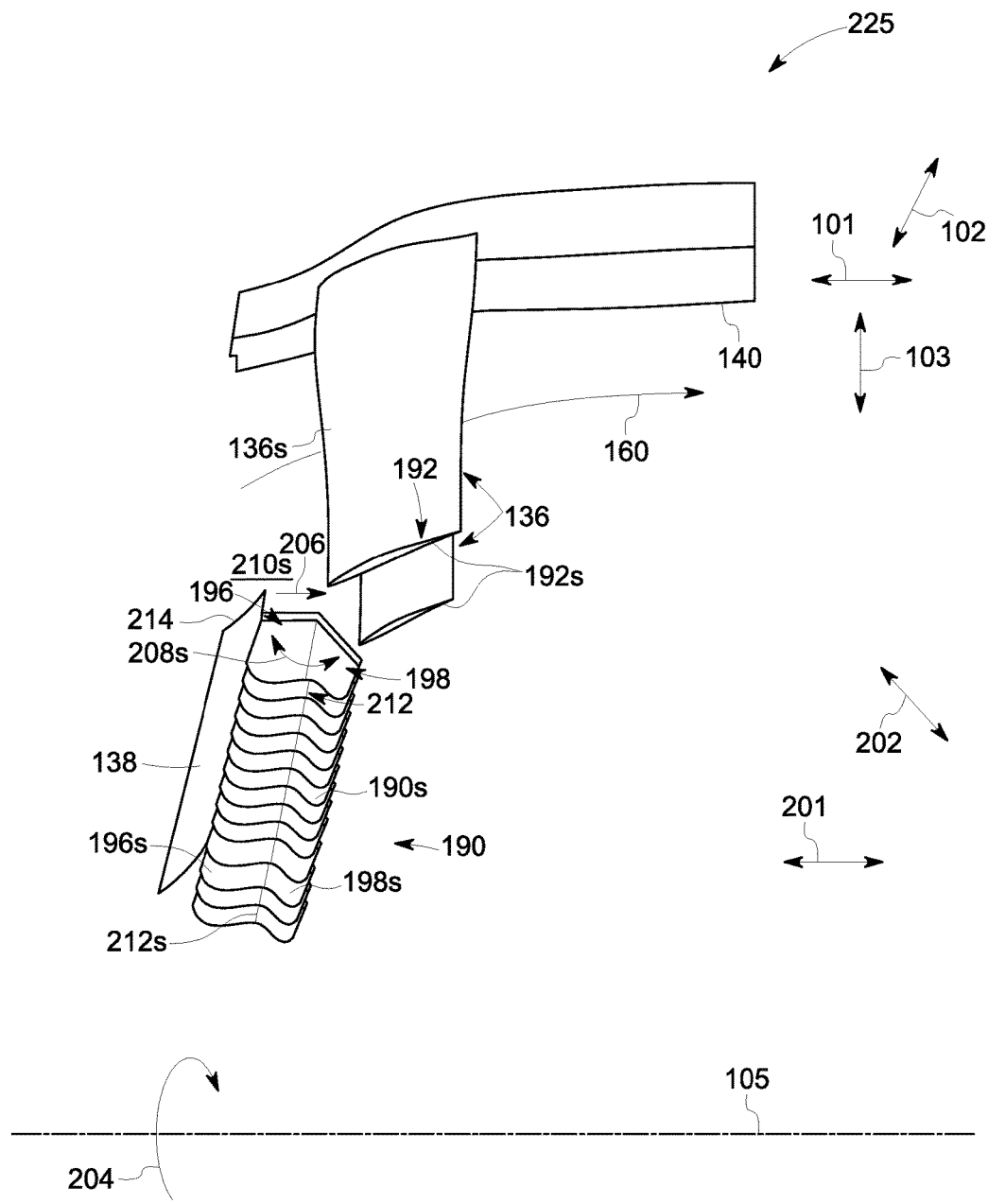
FIG. 5 is an isometric view of a portion of a compressor including a plurality of end-wall treatments formed in a hub of a compressor in accordance with one exemplary embodiment.

FIG. 5 illustrates an isometric view of another portion 225 of the compressor 130 the plurality of end-wall treatments 190 formed in the hub 138 in accordance to one exemplary embodiment of the present invention.

In one embodiment, the plurality of end-wall treatments 190 faces a tip 192 of each blade 136. The plurality of end-wall treatments 190 is spaced apart from each other, formed into an interior surface 214 of the hub 138 and disposed circumferentially thereabout proximate to the tip 192 of the plurality of stator blades 136s. Specifically, each end-wall treatment 190s faces the tip 192s of each stator blade 136s. Each end-wall treatment 190s includes a forward recess portion 196s, an aft recess portion 198, and an intersection portion 212s coupling the forward recess portion 196s to the aft recess portion 198s. Further, in the illustrated embodiment of FIG. 5, the aft recess portion 198s is bent from the intersection portion 212s and inclined relative to the axial direction 101 of the compressor 130. In this particular embodiment, the forward recess portion 196s extends along the first axis 201 and the aft recess portion 198s extends along the second axis 202 different than the first axis 201. In the illustrated embodiment, the first axis 201 is along the axial direction 101 of the compressor 130 and the second axis 202 is inclined away from the first axis 201 such that it has the directional component along the rotation 204 of the tip 192s of each stator blade 136s. The intersection portion 212s joining the forward recess portion 196s to the aft recess portion 198s is explained in greater detail below.

During operation of the compressor 130, the tip 192s of each stator blade 136s and each end-wall treatment 190s are configured to move relative to each other. Specifically, the hub 138 is configured to rotate 204 about the axial direction 101 so that the fluid flow 160 is generally along the principal direction (i.e. the longitudinal axis 105) of the engine assembly 100. Further, the portion 206 of the fluid 160 located at the tip 192s of each stator blade 136s is recirculated as represented by reference numeral 208s via the recess portions 196s, 198s into the gap 210s formed between the tip 192s of each stator blade 136s and each end-wall treatment 192s. This recirculation 208s of the fluid 160 effectively extracts low momentum flow (i.e. portion 206) present near the tip 192s of each stator blade 136s, energizes the portion 206 of the fluid 160, and returns the energized flow (i.e. portion 206) into the gap 210s near each stator blade 136s. The recirculation 208s of the portion 206 of the fluid 160 will be explained in a greater detail below.

In one embodiment, the plurality of end-wall treatments 190 may be incorporated on cylindrical surfaces of the compressor end-wall 137. In some other embodiment, the plurality of end-wall treatments 190 may be incorporated on various different types of surfaces, for example, conical surfaces or complex curved shaped surfaces of the compressor end-wall 137. In certain other embodiments, the plurality of end-wall treatments 190 may be formed separately and may be coupled to the casing 140 and the hub 138 without deviating from the scope of the present invention.

Figure 6:
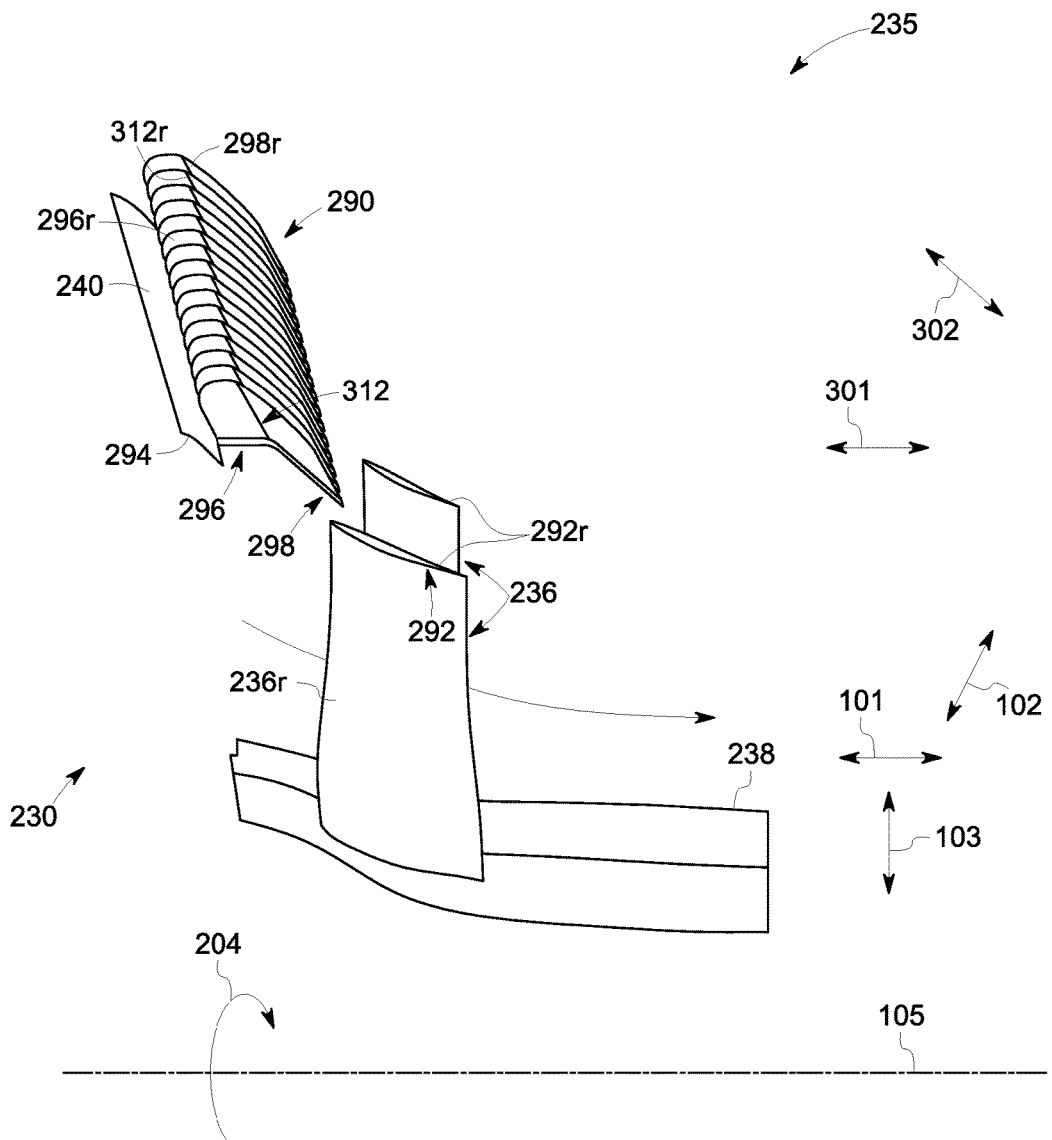
FIG. 6 is an isometric view of a portion of a compressor including a plurality of end-wall treatments formed in a casing of a compressor in accordance with another exemplary embodiment.

FIG. 6 illustrates an isometric view of a portion 235 of a compressor 230 having a plurality of end-wall treatments 290 formed in the casing 240 in accordance to another exemplary embodiment of the present invention.

Figure 7:
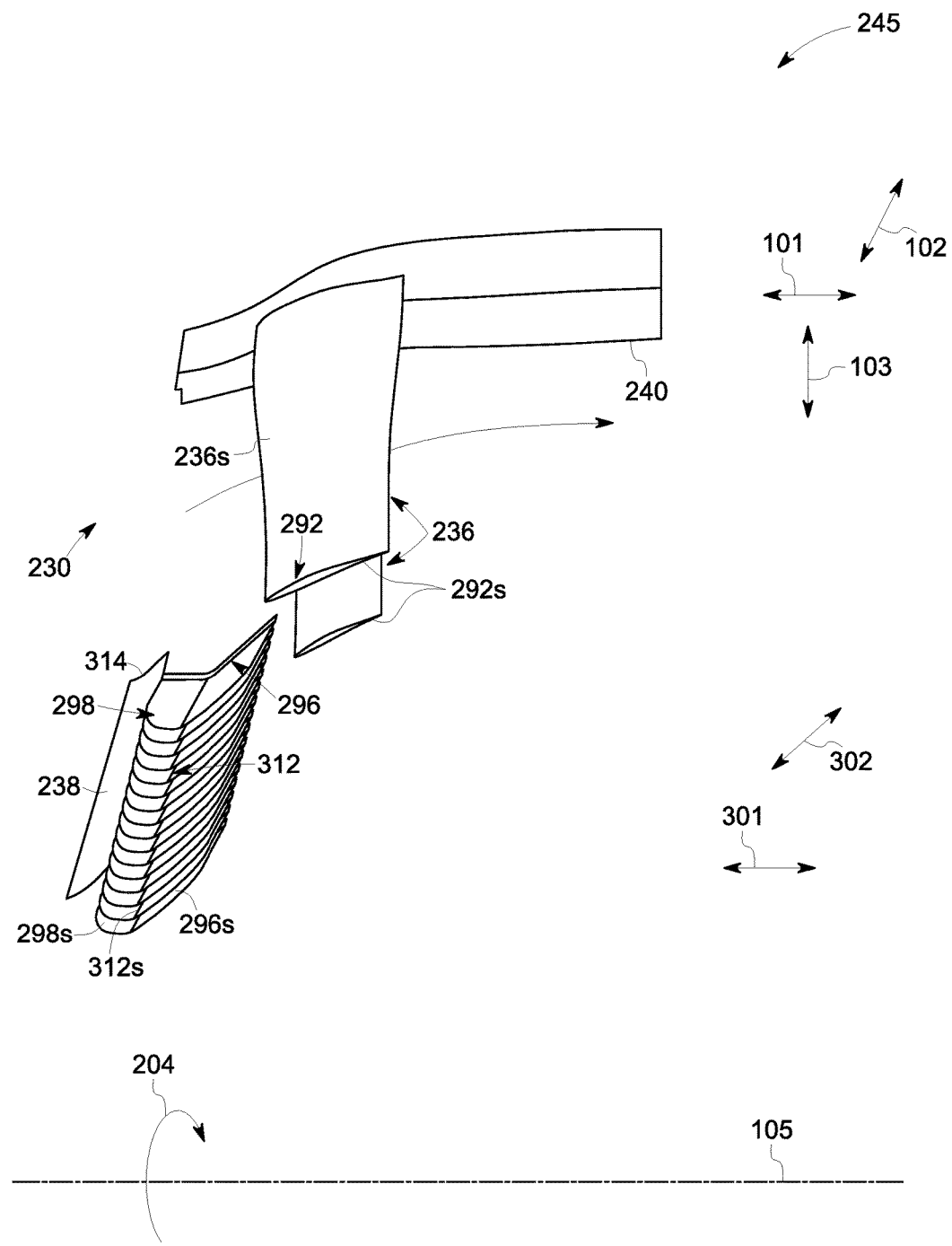
FIG. 7 is an isometric view of a portion of a compressor including a plurality of end-wall treatments formed in a hub of a compressor in accordance with another exemplary embodiment.

The plurality of end-wall treatments 290 may be formed in a hub 238 of the compressor 230, which is explained in greater detail with respect to FIG. 7. The plurality of end-wall treatments 290 formed in the hub 238 and the casing 240 of the compressor 230 includes a forward recess portion 296, an aft recess portion 298, and an intersection portion 312. In the illustrated embodiment, the plurality of end-wall treatments 290 is spaced apart from each other, formed in an interior surface 294 of the casing 240 and disposed circumferentially thereabout proximate to a tip 292 of a plurality of rotor blades 236r. Each end-wall treatment 290 includes a forward recess portion 296r, an aft recess portion 298r, and an intersection portion 312r joining the forward recess portion 296r to the aft recess portion 298r. Further, in the illustrated embodiment of FIG. 6, the aft recess portion 298r is bent from the intersection portion 312r and inclined relative to an axial direction 101 of the compressor 230. In this particular embodiment, the forward recess portion 296r extends along a first axis 301 and the aft recess portion 298r extends along a second axis 302 different than the first axis 301. In the illustrated embodiment, the first axis 301 is along the axial direction 101 of the compressor 230 and the second axis 302 is inclined away from the first axis 301 such that it has a directional component opposite to the rotation 204 of the tip 292r of each rotor blade 236r. The intersection portion 312r joining the forward recess portion 296r to the aft recess portion 298r is explained in greater detail below.

FIG. 7 illustrates an isometric view of another portion 245 of the compressor 230 having the plurality of end-wall treatments 290 formed in the hub 238 in accordance to another exemplary embodiment of the present invention.

The plurality of end-wall treatments 290 is formed in the hub 238 of the compressor 230. In the illustrated embodiment, the plurality of end-wall treatments 290 is spaced apart from each other, formed in an interior surface 314 of the hub 238 and disposed circumferentially thereabout proximate to a tip 292 of a plurality of stator blades 236s. Each end-wall treatment 290 includes a forward recess portion 296s, an aft recess portion 298s, and an intersection portion 312s joining the forward recess portion 296s to the aft recess portion 298s. Further, in the illustrated embodiment of FIG. 7, the aft recess portion 298s is bent from the intersection portion 312s and inclined relative to the axial direction 101 of the compressor 230. In this particular embodiment, the forward recess portion 296s extends along the first axis 301 and the aft recess portion 298s extends along the second axis 302 different than the first axis 301. In the illustrated embodiment, the first axis 301 is along the axial direction 101 of the compressor 230 and the second axis 302 is inclined away from the first axis 301 such that it has the directional component opposite to the rotation 204 of the tip 292s of each stator blade 236s. The intersection portion 312s joining the forward recess portion 296s to the aft recess portion 298s is explained in greater detail below.

Figure 8:
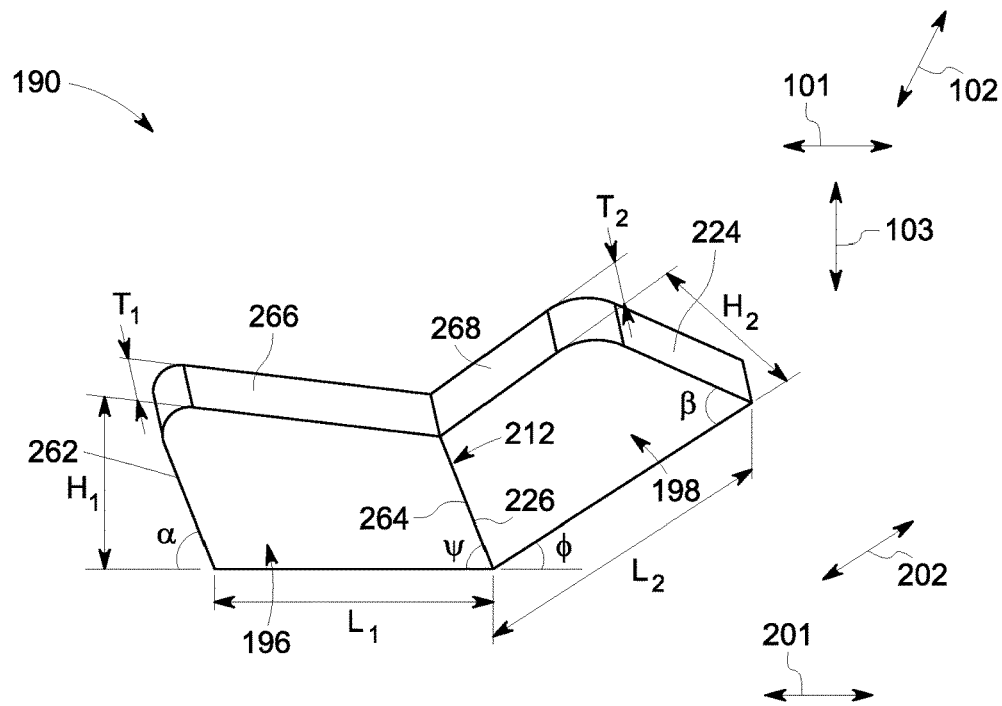
FIG. 8 is an isometric view of an end-wall treatment among a plurality of end-wall treatments in accordance with one exemplary embodiment.

FIG. 8 illustrates an isometric view of one end-wall treatment among the plurality of end-wall treatments 190 in accordance with the exemplary embodiments of FIGS. 4 and 5. The illustrated end-wall treatment 190 may be disposed both in the casing 140 and the hub of the compressor 130.

In the illustrated embodiment, the forward recess portion 196 extends along the first axis 201 to maintain the portion 206 of the fluid flow 160 (as shown in FIGS. 4 and 5) substantially straight through the forward recess portion 196. The aft recess portion 198 extends along the second axis 202 to maintain the portion 206 of the fluid flow 160 substantially straight through the aft recess portion 198. As shown in FIG. 4, the first axis 201 is along the axial direction 101 of the compressor 130 and the second axis 202 is inclined away from the first axis 201 such that it has a directional component along the rotation 204 of the tip 192 of each blade 136.

The forward recess portion 196 includes a downstream opening 264, an upstream wall 262, and an outer wall 266 disposed between the downstream opening 264 and the upstream wall 262. Similarly, the aft recess portion 198 includes a downstream wall 224, an upstream opening 226, and an outer wall 268 disposed between the downstream wall 224 and the upstream opening 226. The downstream opening 264 and the upstream opening 226 are integrated to each other at the intersection portion 212 to define a passage (not shown in FIG. 8) between the forward recess portion 196 and the aft recess portion 198 such that the portion 206 and a sub-portion (not shown in FIG. 8) of the fluid flow is distributed between the portions 196, 198. Further, the aft recess portion 198 is bent from the intersection portion 212 and inclined relative to the axial direction 101 of the compressor 130. The position of the recess portions 196 and 198, orientation, cross-sectional definition, and additional geometrical parameters may be optimized to provide specific solution for any application that desires an increase in stable operating range.

Figure 9:
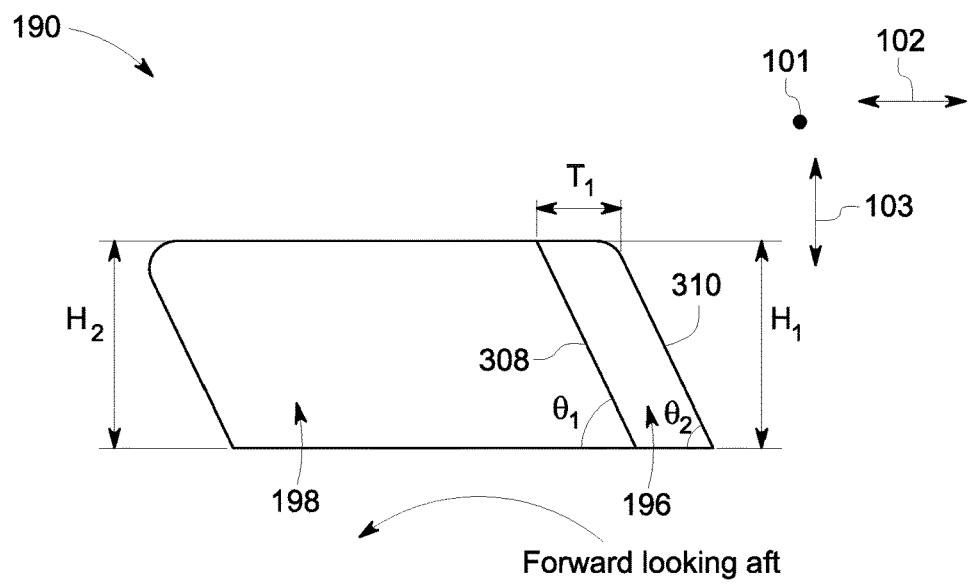
FIG. 9 is a side view of the end-wall treatment in accordance with the exemplary embodiment of FIG. 8.
Figure 10:
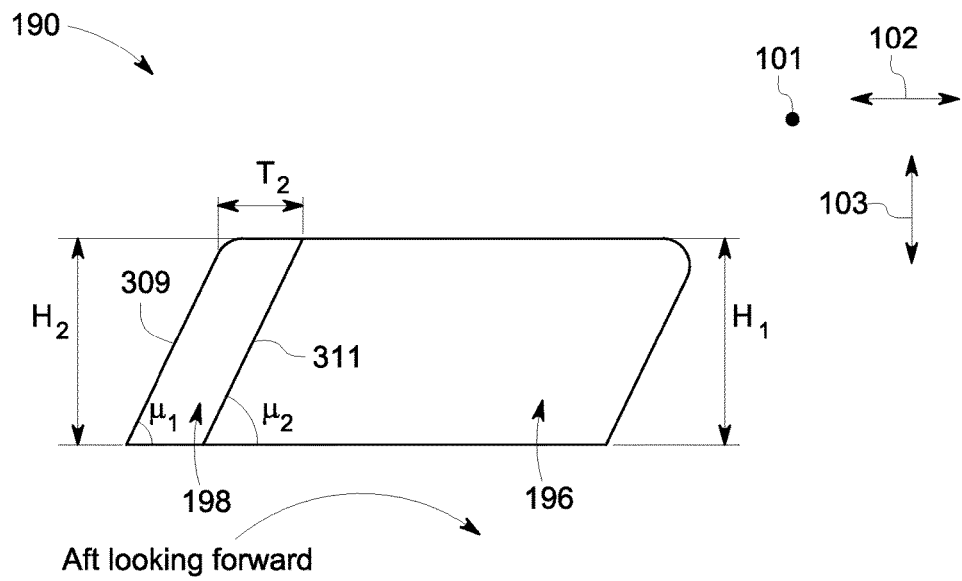
FIG. 10 is another side view of the end-wall treatment in accordance with the exemplary embodiment of FIG. 8.

The forward recess portion 196 is defined by an axial lean "α" of the upstream wall 262 and circumferential leans "$\theta_1$" and "$\theta_2$" (as shown in FIG. 9). The forward recess portion 196 is further defined by a radial height "$H_1$", a circumferential thickness "$T_1$", and an axial length "$L_1$". The aft recess portion 198 is defined by an axial lean "β" of the downstream wall 224 and circumferential leans "$\mu_1$" and "$\mu_2$" (as shown in FIG. 10). In the illustrated embodiment, the axial lean "α" is inclined relative to the axial direction 101 of the compressor 130 and the axial lean "β" is inclined relative to the second axis 202. The aft recess portion 198 is further defined by a radial height "$H_2$", a circumferential thickness "$T_2$", and an axial length "$L_2$". The intersection portion 212 is inclined at an angle "ψ" (bend lean angle) relative to the first axis 201. In the illustrated embodiment, the bend lean angle "ψ" is relative to the axial direction 101 of the compressor 130. In the illustrated embodiment, the aft recess portion is inclined at an angle "Φ" (i.e. bend angle) relative to the axial direction of the compressor 130. Specifically, in the embodiment shown in FIG. 8, the bend angle "Φ" defines the orientation of the second axis 201. Similarly, in one or more embodiments, the bend angle "Φ" may define the orientation of the first and second axes 201, 202. The thicknesses "$T_1$" and "$T_2$" may vary along their respective axes 201, 202, as well as at different radial location (L e. along the radial direction 103) in the recesses 196, 198.

In one embodiment, the axial leans "α" and "β" of the upstream wall 262 and the downstream wall 224 respectively may be equal. In certain other embodiments, the "α" and "β" of the upstream wall 262 and the downstream wall 224 respectively may not be equal. Similarly, in the illustrated embodiment, the radial heights "$H_1$" and "$H_2$", the circumferential thicknesses "$T_1$" and "$T_2$", and the axial lengths "$L_1$" and "$L_2$" are substantially same. In certain other embodiments, the radial heights "$H_1$" and "$H_2$", the circumferential thicknesses "$T_1$" and "$T_2$", and the axial lengths "$L_1$" and "$L_2$" may vary according to the application and design criteria.

The axial lean "α" of the upstream wall 262 may be designed to minimize flow losses arising when portion 206 of the fluid flow 160 is being recirculated into the gap 210. In the illustrated embodiment, the axial lean "β" of the downstream wall 224 may be designed to minimize flow losses arising when the portion 206 and sub-portion 216 of the fluid flow 160 is being exchanged with the forward recess portion 196 of the end-wall treatment 190.

FIG. 9 is a side view of the end-wall treatment 190 in accordance with the exemplary embodiment of FIG. 8. The end-wall treatment 190 represented in FIG. 9 is a forward looking aft view.

Figure 18:
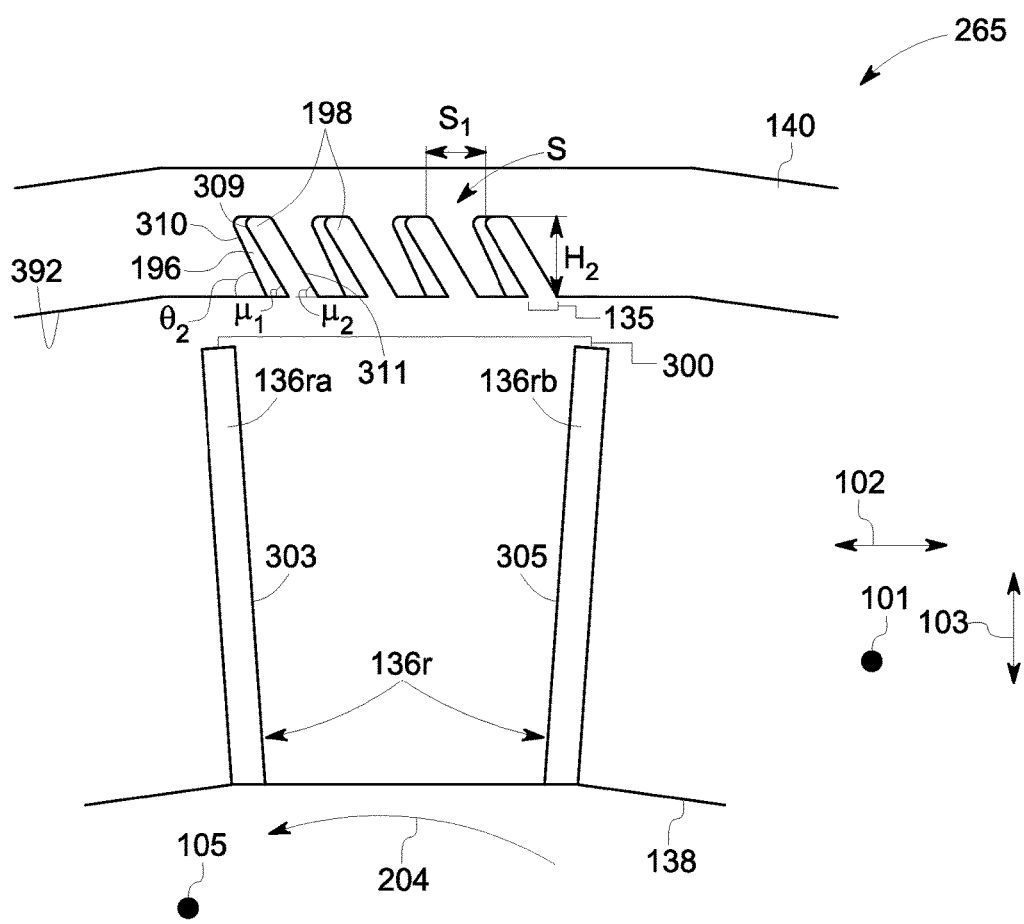
FIG. 18 is a schematic cross-sectional view of a portion of the compressor of FIG. 17, including the end-wall treatment among the plurality of end-wall treatments in accordance with one or more exemplary embodiments.

In the illustrated embodiment, the forward recess portion 196 is further defined by a first sidewall 308 and a second sidewall 310. Generally, similar to the axial lean "α", the first sidewall 308 and the second sidewall 310 of the forward recess portion 196 is inclined at an angle to define the circumferential leans "$θ_1$" and "$θ_2$", respectively with respect to a surface 392 (as shown in FIG. 18) of the compressor end-wall 137 (i.e. surface corresponding to the casing 140 and hub 138 where the end-wall treatment 190 is formed). Specifically, the circumferential leans "$θ_1$" and "$θ_2$" is along the circumferential direction 102 of the compressor 130 and is in a range from about 5 degrees to about 175 degrees relative to the surface 392 of the compressor end-wall 137 at which the end-wall treatment 190 is formed. In one embodiment, the circumferential lean "$θ_1$" of first sidewall 308 and the circumferential lean "$θ_2$" of the second sidewall 310 may be equal. In certain other embodiments, the circumferential lean "$θ_1$" of first sidewall 308 and the circumferential lean "$θ_2$" of the second sidewall 310 may not be equal. In the illustrated embodiment, the forward recess portion 196 has the circumferential thickness "$T_1$" and radial height "$H_1$".

Figure 19:
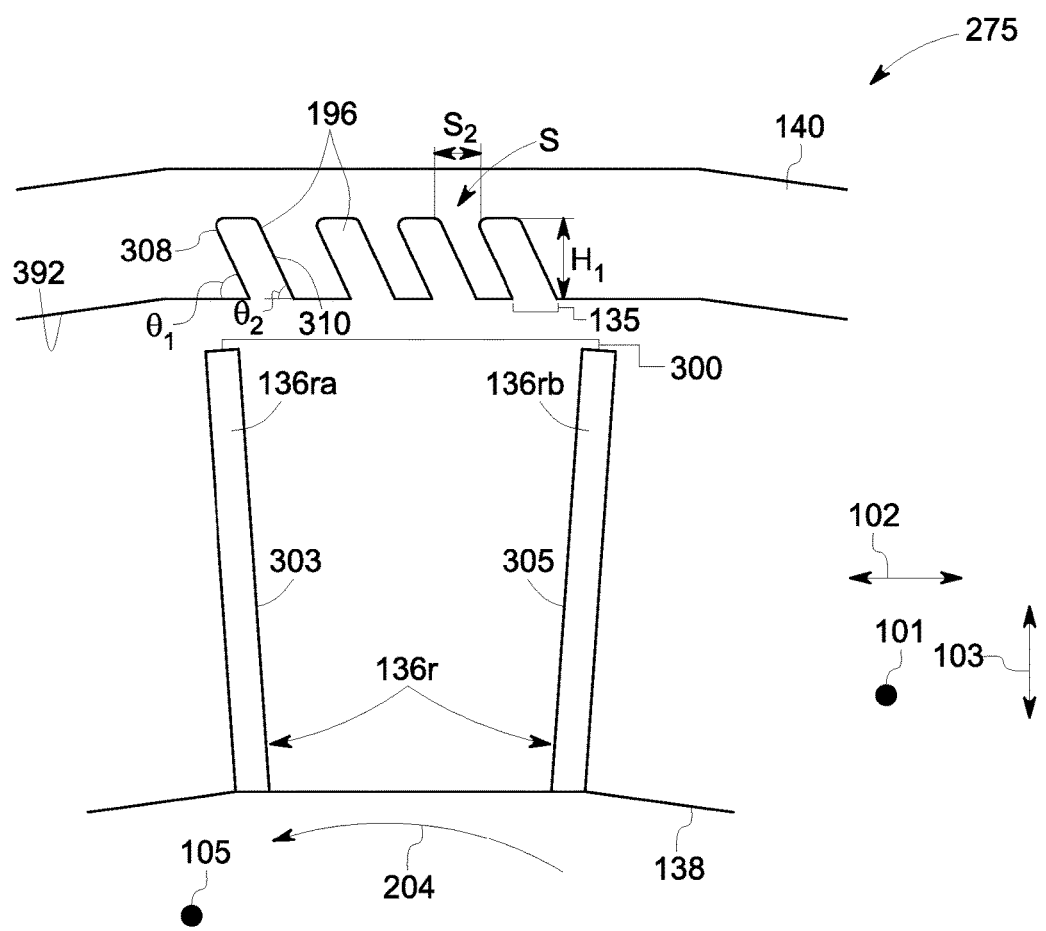
FIG. 19 is a schematic cross-sectional view of another portion of the compressor of FIG. 17, including the end-wall treatment among the plurality of end-wall treatments in accordance with one or more exemplary embodiments.

In one embodiment, the aft recess portion 198 is further defined by a first sidewall 309 (as shown in FIG. 10) and a second sidewall 311. In the illustrated view of the embodiment, the second sidewall 311 of the aft recess portion 198 is inclined at an angle to define a circumferential lean "$μ_2$" with respect to a surface 392 (as shown in FIG. 19) of the compressor end-wall 137. In the illustrated embodiment, the aft recess portion 198 has the circumferential thickness "$T_2$" and radial height "$H_2$". In the illustrated embodiment, the radial height "$H_1$" and "$H_2$" is equal. In some other embodiment, the radial height "$H_1$" and "$H_2$" may not be equal. Similarly, in the illustrated embodiment, the circumferential thicknesses "$T_1$" and "$T_2$" are not equal. In some other embodiment, the circumferential thicknesses "$T_1$" and "$T_2$" may be equal. The radial height "$H_1$" and "$H_2$" and the circumferential thicknesses "$T_1$" and "$T_2$" may vary along the axial direction 101 of the compressor 130.

FIG. 10 is a side view of the end-wall treatment 190 in accordance with the exemplary embodiment of FIG. 8. The end-wall treatment 190 represented in FIG. 10 is an aft looking forward view.

In the illustrated embodiment, the aft recess portion 198 is defined by the first sidewall 309 and the second sidewall 311. Generally, similar to the axial lean "β", the first sidewall 309 and the second sidewall 311 of the aft recess portion 198 is inclined at an angle to define the circumferential leans "$μ_1$" and "$μ_2$", respectively with respect to the surface 392 (as shown in FIG. 19) of the compressor end-wall 137 (i.e. surface corresponding to the casing 140 and hub 138 where the end-wall treatment 190 is formed). Specifically, the circumferential leans "$μ_1$" and "$μ_2$" is along the circumferential direction 102 of the compressor 130 and is in a range from about 5 degrees to about 175 degrees relative to the surface 392 of the compressor end-wall 137 at which the end-wall treatment 190 is formed. In one embodiment, the circumferential lean "$μ_1$" of first sidewall 309 and the circumferential lean "$μ_2$" of the second sidewall 311 may be equal. In certain other embodiments, the circumferential lean "$μ_1$" of first sidewall 309 and the circumferential lean "$μ_2$" of the second sidewall 311 may not be equal. In the illustrated embodiment, the aft recess portion 198 has the circumferential thickness "$T_2$" and radial height "$H_2$".

In the illustrated view of the embodiment, the forward recess portion 196 has the second sidewall 310 which is inclined at the angle "$θ_2$" to define the circumferential lean with respect to the surface 392 (as shown in FIG. 18) of the compressor end-wall 137. In the illustrated embodiment, the forward recess portion 196 has the circumferential thickness "$T_1$" and radial height "$H_1$". In the illustrated embodiment, the radial height "$H_1$" and "$H_2$" is equal. In some other embodiment, the radial height "$H_1$" and "$H_2$" may not be equal. Similarly, in the illustrated embodiment, the circumferential thicknesses "$T_1$" and "$T_2$" are not equal. In some other embodiment, the circumferential thicknesses "$T_1$" and "$T_2$" may be equal.

Figure 21:
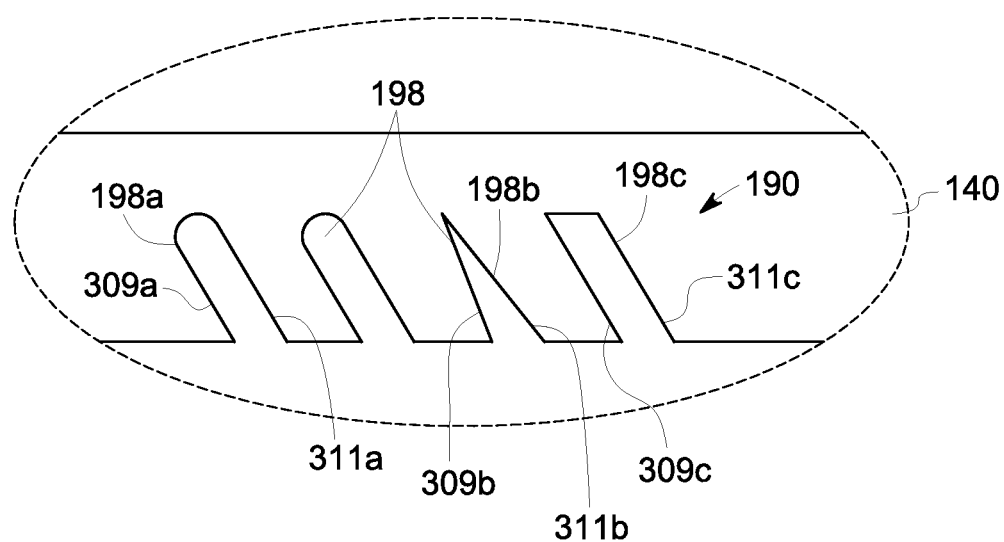
FIG. 21 is a schematic view of a plurality end-wall treatments in an aft looking forward direction in accordance with another exemplary embodiment.

In the embodiment shown in FIGS. 9 and 10, the circumferential leans angles "$θ_1$" and "$μ_1$" of the first sidewalls 308 and 309 respectively are designed to effectively extract the leakage flows 188 (as shown in FIG. 2). The circumferential leans angles "$θ_2$" and "$μ_2$" of the second sidewalls 310, 311 respectively are designed to minimize the mixing loss with the main flow 160. As best illustrated in FIGS. 9 and 10, the forward and aft recess portions 196, 198 include a geometric shape having an overall linear shape from the first sides 308 and 309 to the second sidewalls 310 and 311 respectively. Appropriate choice of curvature may minimize aerodynamic loss within the recess portions 196, 198, and more particularly minimize energy dissipation near sidewalls 308 and 311 meeting at an angle with respect to the intersection portion 212. In an alternate embodiment, each of the forward and aft recess portions 196, 198 may include a geometric shape having an overall curvilinear shape from the first sidewalls 308 and 309 to the second sidewall 309 and 310, as best illustrated in FIG. 21.

Figure 11:
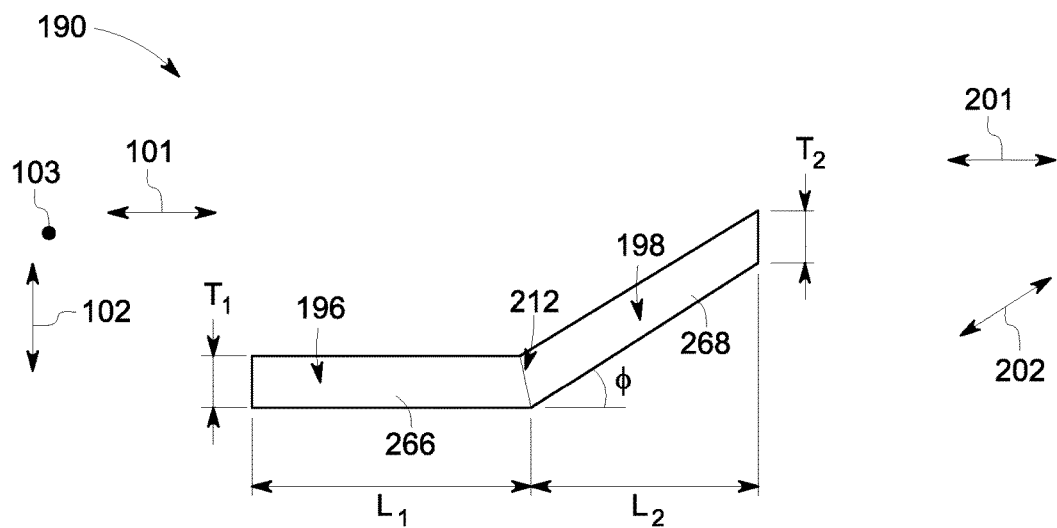
FIG. 11 is a top view of the end-wall treatment in accordance with the exemplary embodiment of FIG. 8.

FIG. 11 is a top view of the end-wall treatment 190 in accordance with the exemplary embodiment of FIG. 8.

In the illustrated embodiment, the forward recess portion 196 has the outer wall 266 and the aft recess portion 198 has the outer wall 268. The forward recess portion 196 is joined to the aft recess portion 198 via the intersection portion 212 which is inclined relative to the first axis 201. Specifically, in the illustrated embodiment, the intersection portion 212 is inclined relative to the axial direction 101 of the compressor 130. The aft recess portion 198 is bent from the intersection portion 212 and inclined at the bend angle "Φ" relative to the axial direction 101 of the compressor 130. In one embodiment, of the present invention, the bend angle "Φ" is in a range from about −170 degrees to about 170 degrees. The bend angle "Φ" may specifically define the orientation of the first and second axes 201 and 202. In the illustrated embodiment, the bend angle "Φ" defines the orientation of the second axis 202 along which the aft recess portion 198 is extended from the forward recess portion 196.

The forward recess portion 196 has the circumferential thickness "$T_1$" and the axial length "$L_1$" and the aft recess portion 198 has the circumferential thickness "$T_2$" and the axial length "$L_2$". In the illustrated embodiment, the circumferential thicknesses "$T_1$" and "$T_2$" is substantially equal. In some other embodiment, the circumferential thicknesses "$T_1$" and "$T_2$" may not be equal, and is designed based on the application and design criteria. Similarly, the axial lengths "$L_1$" and "$L_2$" is substantially equal. In some other embodiment, the axial lengths "$L_1$" and "$L_2$" may not be equal, which is designed based on the application and design criteria.

Figure 12:
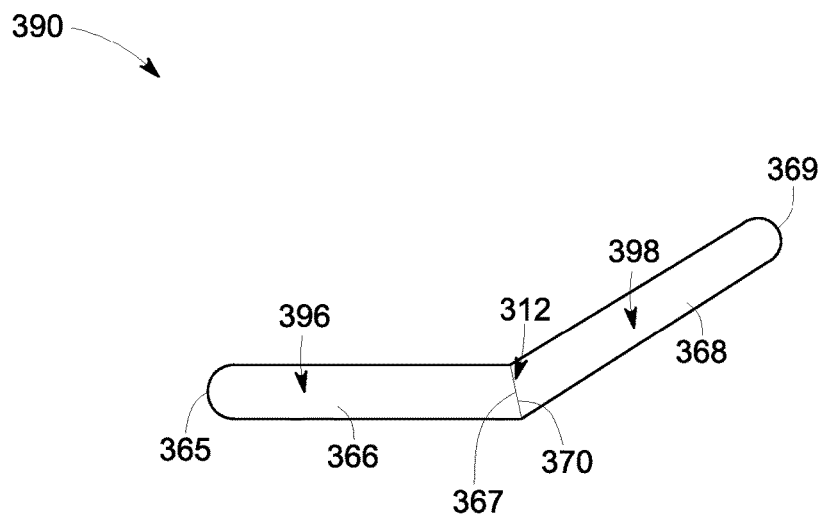
FIG. 12 is a top view of an end-wall treatment among a plurality of end-wall treatments in accordance with another exemplary embodiment.

FIG. 12 is a top view of an end-wall treatment among a plurality of end-wall treatments 390 in accordance with another exemplary embodiment.

In the illustrated embodiment, the end-wall treatment 390 includes a forward recess portion 396 and an aft recess portion 398. The forward recess portion 396 includes an outer wall 366 and the aft recess portion 398 includes an outer wall 368. The outer wall 366 has a downstream end 367 and an upstream end 365. Similarly, the outer wall 368 has a downstream end 369 and an upstream end 370. The downstream end 367 is joined to the upstream end 370 at the intersection portion 312 to define a passage downward between the forward recess portion 396 and the aft recess portion 398. In the illustrated embodiment, the downstream end 369 and the upstream end 365 have an overall curvilinear profile. In some other embodiment, the downstream end 369 and the upstream end 365 have an overall linear profile, a triangular profile, and the like. Appropriate choice of curvature may minimize aerodynamic loss within the recess portions 396, 398, and more particularly minimize energy dissipation near ends 367, 370 meeting at an angle with respect to the intersection portion 212.

Figure 13:
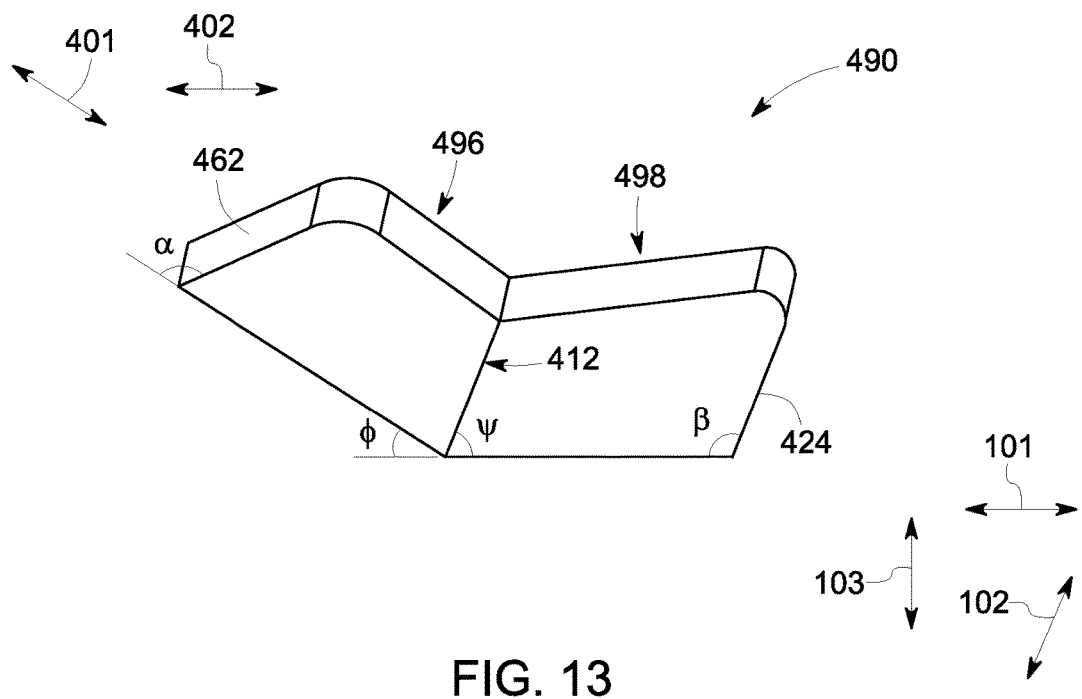
FIG. 13 is an isometric view of an end-wall treatment among a plurality of end-wall treatments in accordance with another exemplary embodiment.

FIG. 13 is an isometric view of an end-wall treatment among a plurality of end-wall treatments 490 in accordance with another exemplary embodiment.

In the illustrated embodiment, the end-wall treatment 490 includes a forward recess portion 496, an aft recess portion 498, and the intersection portion 414 joining the aft portion 498 with the forward recess portion 496 to define a flow passage (not shown in FIG. 13) between the recess portions 496 and 498.

The forward recess portion 496 has an upstream wall 462 and the aft recess portion has a downstream wall 424. The upstream wall 462 has an axial lean "α" which is inclined relative to the first axis 401 and the downstream wall 424 has an axial lean "β" which is inclined relative to the second axis 402. Specifically, in the illustrated embodiment, the axial lean "β" is inclined relative to the axial direction 101 of the compressor 130. The intersection portion 412 joining the forward and aft recess portions 496 and 498 is inclined at a bend lean angle "ψ" relative to the second axis 402, which in this embodiment corresponds to the axial direction 101 of the compressor 130. Further, the forward recess portion 496 is bent from the intersection portion 412 and inclined at an angle "Φ" (bend angle) relative to the axial direction 101 of the compressor 130.

Figure 14:
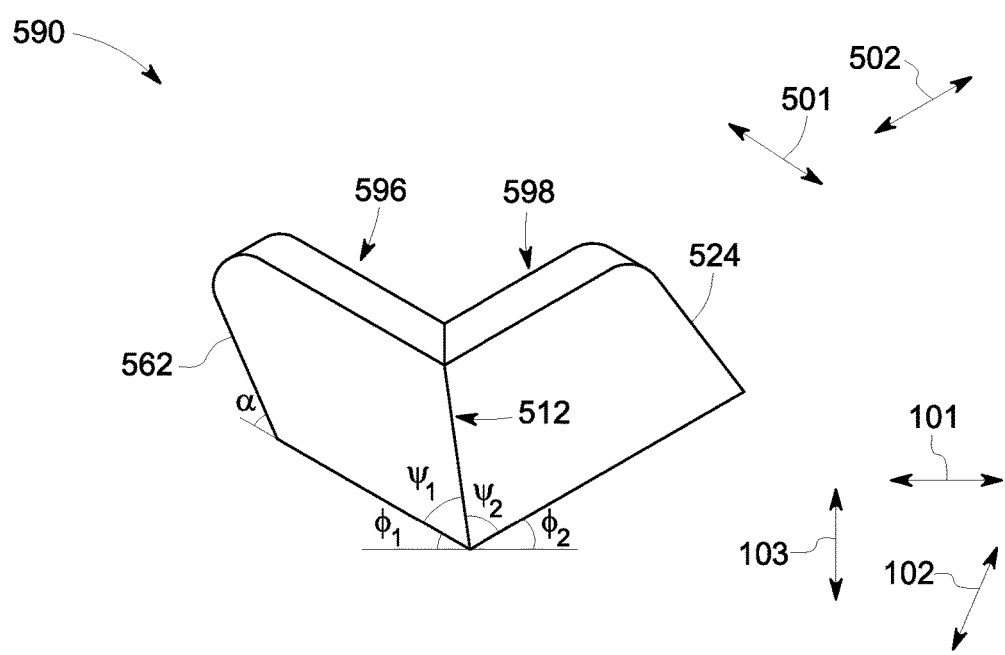
FIG. 14 is an isometric view of an end-wall treatment among a plurality of end-wall treatments in accordance with yet another exemplary embodiment.

FIG. 14 is an isometric view of an end-wall treatment among a plurality of end-wall treatments 590 in accordance with yet another exemplary embodiment.

In the illustrated embodiment, the end-wall treatment 590 includes a forward recess portion 596, an aft recess portion 598, and the intersection portion 514 joining the aft portion 598 with the forward recess portion 596 to define a flow passage (not shown in FIG. 14) between the recess portions 596 and 598.

The forward recess portion 596 has an upstream wall 562 and the aft recess portion has a downstream wall 524. The upstream wall 562 has an axial lean "α" which is inclined relative to the first axis 501 and the downstream wall 524 has an axial lean "β" which is inclined relative to the second axis 502. The intersection portion 512 joining the forward and aft recess portions 596 and 598 is inclined at bend lean angles "$\psi_1$" and "$\psi_2$" relative to the first and second axes 501 and 502 respectively. Further, the forward recess portion 596 is bent from the intersection portion 512 and inclined at a first angle "$\Phi_1$" (first bend angle) relative to an axial direction 101 of the compressor 130 and the aft recess portion 598 is bent from the intersection portion 512 and inclined at a second angle "$\Phi_1$" (second bend angle) relative to the axial direction 101 of the compressor 130.

Figure 15:
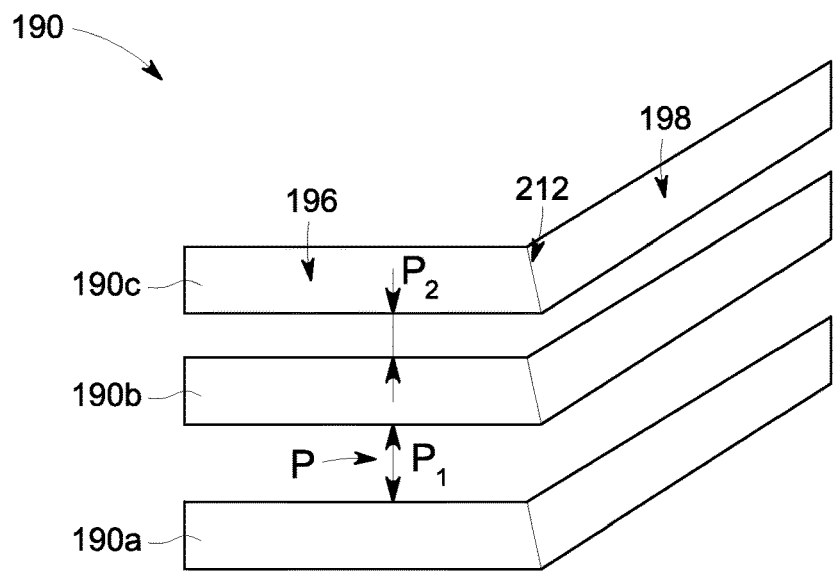
FIG. 15 is a top view of a plurality of end-wall treatments in accordance with the exemplary embodiment of FIG. 8.

FIG. 15 is a top view of a plurality of end-wall treatments 190 in accordance with the exemplary embodiments of FIGS. 8 and 11.

In the illustrated embodiment, the plurality of end-wall treatments 190 is not equally spaced apart from each other. In the illustrated embodiment, the plurality of end-wall treatments 190 includes a first end-wall treatment 190a, a second end-wall treatment 190b, and a third end-wall treatment 190c. The first end-wall treatment 190a and the second end-wall treatment 190b are spaced apart from each other by a circumferential pitch "$P_1$". Similarly, the second end-wall treatment 190b and the third end-wall treatment 190c are spaced apart from each other by a circumferential "$P_2$" different than the circumferential "$P_1$". The variation in the pitches "$P_1$" and "$P_2$" between each end-wall treatment 190 may help in varying quantity and frequency of the recirculation fluid 208r and 208s (as shown in FIGS. 3, 4 and 5) being injected into the gaps 210r and 210s (as shown in FIGS. 3, 4, and 5).

Figure 16:
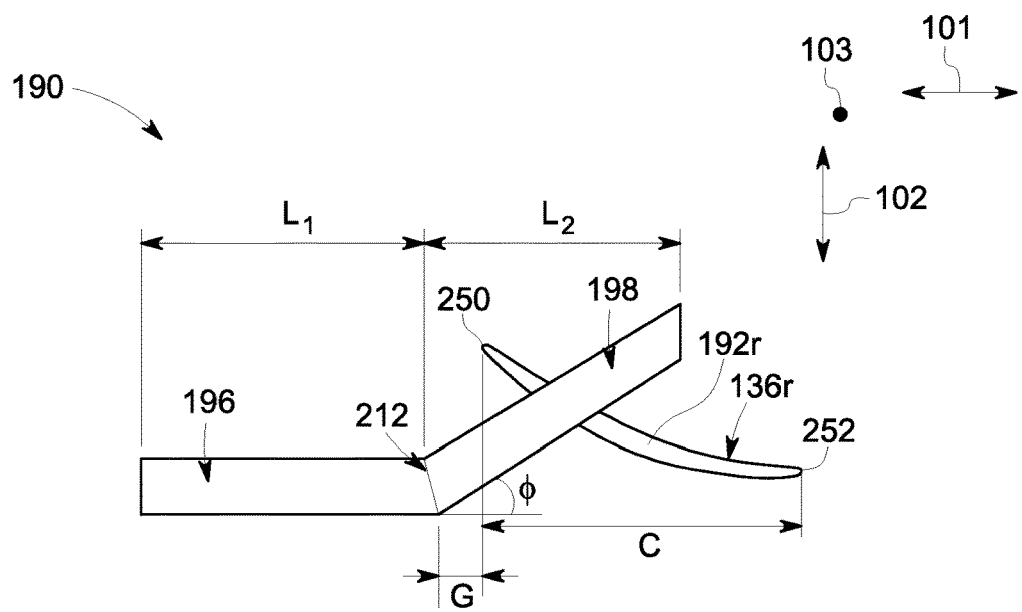
FIG. 16 is a top view of the end-wall treatment and a rotor blade in accordance with the exemplary embodiment of FIG. 8.

FIG. 16 is a top view of the end-wall treatment 190r and a rotor blade 136r in accordance with the exemplary embodiment of FIG. 8. In the illustrated embodiment, the tip 192r of the rotor blade 136r rotates along the circumferential direction 102 of the compressor 130 and each rotor blade 136r has an axial chord length "C". In one embodiment, the axial chord length "C" may represent direct axial distance between a leading edge 250 and a trailing edge 252 of the tip 192r of the rotor blade 136r. Further, the end-wall treatment 190 has a bend offset "G". In one embodiment, the bend offset "G" may be defined as an axial gap formed between the intersection portion 212 and the leading edge 250 of the blade 136. Specifically, the illustrated embodiment represents bend offset "G" as the axial gap between the intersection region 212 where the bend angle "Φ" is formed in the end-wall treatment 190 and the leading edge 250 of the rotor blade 136r. In one embodiment, the bend offset "G" may be in a range from about −100 percent to about 300 percent of the axial chord length "C" of the tip 192 of each blade among the plurality of rotor and stator blades 136r and 136s.

Figure 17:
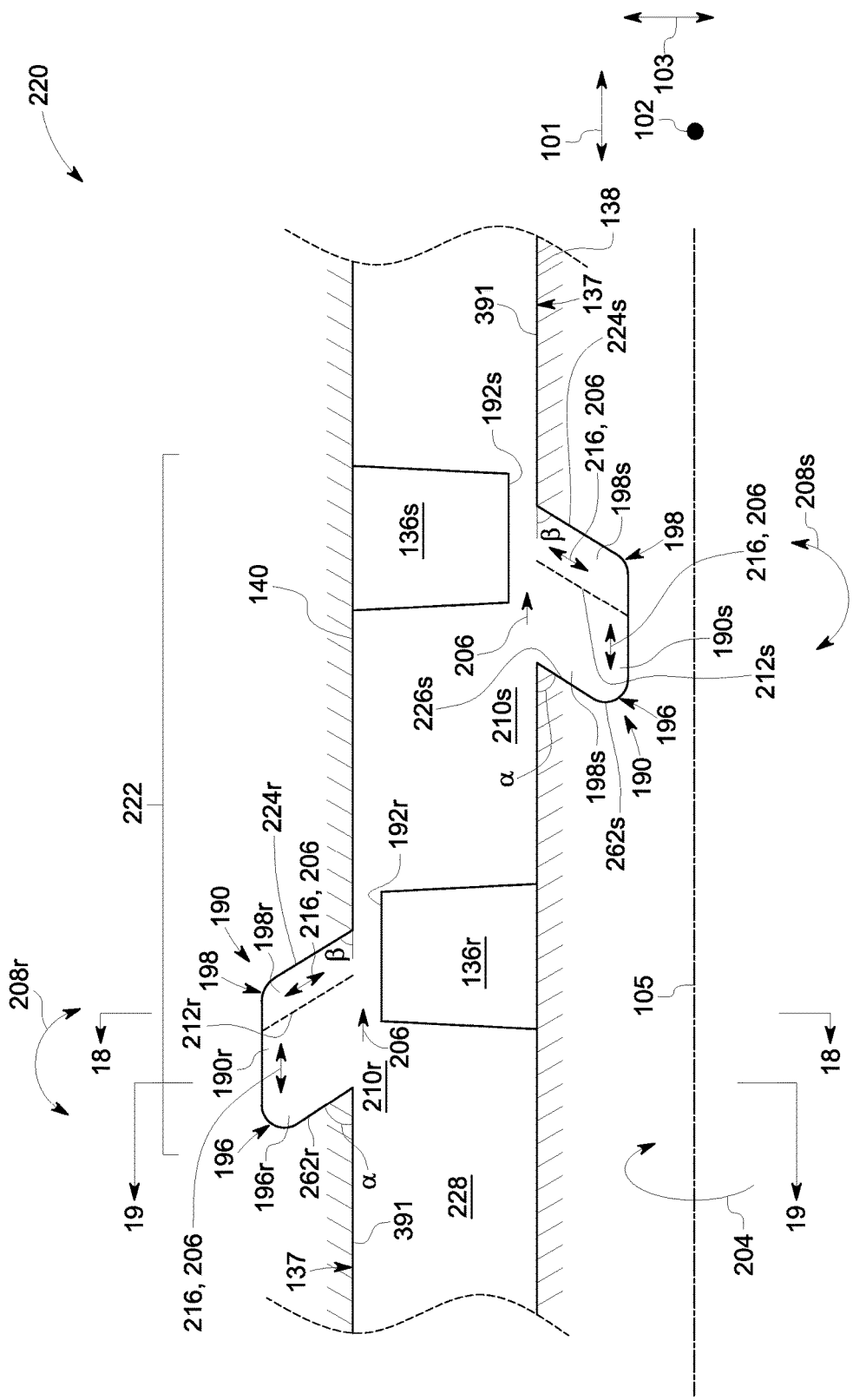
FIG. 17 is a schematic cross-sectional view of the portion of the compressor including the end-wall treatment among the plurality of end-wall treatments in accordance with the exemplary embodiments of FIGS. 3, 4, and 5.

FIG. 17 is a schematic cross-sectional view of a portion 255 of the compressor 130 including the end-wall treatment among the plurality of end-wall treatments 190 in accordance with the exemplary embodiments of FIGS. 3, 4, and 5. Specifically, the schematic view in FIG. 17 is along the axial-radial plane of the compressor 130. The portion 255 shown in FIG. 17 illustrates one stage 222 of the compressor 130. The stage 222 includes the end-wall treatment 190 disposed in the casing 140 and the hub 138. Specifically, the end-wall treatment 190r is disposed in the casing 140 and the end-wall treatment 190s is disposed in the hub 138. As discussed in the embodiment shown in FIGS. 3, 4 and 5, the end-wall treatment 190 includes the forward recess portion 196 and the aft recess portion 198. Specifically, the end-wall treatment 190r includes the forward recess portion 196r disposed along the first axis 201 and the aft recess portion 198r extending from the forward recess portion 196r along the second axis 202. Similarly, the end-wall treatment 190s includes the forward recess portion 196s disposed along the first axis 201 and the aft recess portion 198s extending from the forward recess portion 196s along the second axis 202. In the illustrated embodiment, the aft recess portion 198 is joined to the forward recess portion 196 via the intersection portion 212 (shown in a dotted line). The intersection portion 212 is inclined at the angle "ψ" (bend lean angle) relative to the first axis 201, which according to the embodiment shown in FIG. 17 is along the axial direction 101 of the compressor 130.

The forward recess portion 196 has the axial lean "α" relative to a surface 391 of the compressor end-wall 137. Specifically, the axial lean "α" relates to the upstream wall 262 of the forward recess portion 196, which is inclined relative to the axial direction 101 of the compressor 130. Similarly, the aft recess portion 198 has the axial lean "β" relative to the surface 391 of the compressor end-wall 137. Specifically, the axial lean "β" relates to the downstream wall 224 of the aft recess portion 198, which is inclined relative to the axial direction 101 of the compressor 130.

During operation of the compressor 130, the tips 192r and 192s of each rotor and stator blades 136r and 136s respectively, and the end-wall treatments 190r and 190s are configured to move relative to each other. The end-wall treatment 190 is configured for recirculating 208r and 208s the portion 206 of the fluid flow 160 into the gaps 210r and 210s with minimal effect on efficiency penalty of the compressor 130. In one embodiment, when the hub 138 of the compressor 130 rotates, the fluid flow 160 (as shown in FIGS. 3, 4, and 5) from the booster compressor 110 (as shown in FIG. 1) enters a flow passage 228 formed between the hub 138 and the casing 140. The portion 206 of the fluid 160 at the tips 192r and 192s of the rotor and stator blades 136r and 136s respectively is extracted into recess portions 196 and 198. The portion 206 extracted into the forward recess portion 196 flows along the first axis 201 to maintain the flow substantially straight through the forward recess portion 196. Similarly, the portion 206 extracted into the aft recess portion 198 flows along the second axis 202 to maintain the flow substantially straight through the aft recess portion 198. In such embodiment, a sub-portion 216 of the portion 206 of the fluid 160 is distributed from the forward recess portion 196 into the aft recess portion 198 and the sub-portion 216 of the portion 206 of the fluid 160 is redistributed from the aft recess portion 198 into the forward recess portion 196. Finally, the portion 206 and the sub-portion 216 of the fluid 160 are recirculated into the gaps 210r and 210s formed between the tips 192r and 192s of each blade 136 and the end-wall treatment 190.

FIG. 18 is a schematic cross-sectional view of a portion 265 of the compressor 130 taken along view 18-18 of FIG. 17 including the end-wall treatment 190r embedded in the casing 140 in accordance with one or more exemplary embodiments. Specifically, the schematic cross-sectional view of the portion 265 is aft looking forward view along the axis (i.e. the longitudinal axis 105) of rotation 204.

In one embodiment, a blade passage 300 (of which only one is illustrated) is defined between adjacent rotor blades 136r, and more particularly between a suction side 303 of a first blade 136ra and pressure side 305 of an adjacently positioned second blade 136rb. As best illustrated in FIG. 18, in one embodiment the plurality of end-wall treatments 190 formed about the casing 140 is approximately about 1 to about 16 per blade passage 300. In some other embodiment, the plurality of end-wall treatments 190 may be in a range from about 0 to about 100 per blade passage 300.

The aft recess portion 198 is defined by the first sidewall 309 and the second sidewall 311. The first sidewall 309 and the second sidewall 311 is inclined at an angle to define the circumferential leans "$\mu_1$" and "$\mu_2$", with respect to the surface 392 in the compressor end-wall 137. Specifically, the circumferential leans "$\mu_1$" and "$\mu_2$" is along the circumferential direction 102 of the compressor 130. In the illustrated embodiment, the forward recess portion 196 has the second wall 310, which is inclined at an angle to define the circumferential leans "$\theta_2$" with respect to the surface 392 in the compressor end-wall 137.

Referring to FIG. 18, a percentage of the aft recess portion 198 may be defined as slot non-metal area 135 relative to the blade passage area 300. In one embodiment, the percentage of the aft recess portion's non-metal area 135 is between 10% and 90% of the blade passage area 300 and may vary in the radial direction 103 of the compressor 130. That is to say, the circumferential coverage of aft recess portion 198 may vary in the radial direction 103. By varying the circumferential coverage in the radial direction, it is possible to minimize aerodynamic loss within the aft recess portion 198. Similarly, a percentage of the forward recess portion 196 may also be defined as forward recess portion's non-metal area 135 (as labeled in FIG. 19) relative to the blade passage area 300, which may vary in the radial direction 103 of the compressor 130. By varying the circumferential coverage in the radial direction, it is possible to minimize aerodynamic loss within the forward recess portion 196.

In one embodiment, a solidity "S" may be defined as amount of metal present between the end-wall treatments 190 in the circumferential direction 102 of the compressor 130. Specifically, a solidity "$S_1$" may relate to the amount of metal present between the aft recess portions 198 in the circumferential direction 102. In one embodiment, the number of end-wall treatments 190 per each blade passage 300 and solidity "S" of the end-wall treatment 190 defines the thickness "T" of each end-wall treatment 190. Specifically, the solidity "$S_1$" and the number of end-wall treatments 190 (i.e. aft recess portions 198) per each blade passage 300 define the thickness "$T_2$" of the aft recess portion 198.

FIG. 19 is a schematic cross-sectional view of a portion 275 of the compressor 130 taken along view 19-19 of FIG. 17 including the end-wall treatment 190r embedded in the casing 140 in accordance with one or more exemplary embodiments. Specifically, the schematic cross-sectional view of the portion 275 is aft looking forward view along the axis (i.e. the longitudinal axis 105) of rotation 204.

In one embodiment, the blade passage 300 (of which only one is illustrated) is defined between adjacent rotor blades 136r, and more particularly between a suction side 303 of a first blade 136ra and pressure side 305 of an adjacently positioned second blade 136rb. The forward recess portion 196 is defined by the first sidewall 308 and the second sidewall 310. The first sidewall 308 and the second sidewall 310 is inclined at an angle to define the circumferential leans "$\theta_1$" and "$\theta_2$", with respect to the surface 392 in the compressor end-wall 137. Specifically, the circumferential leans "$\theta_1$" and "$\theta_2$" is along the circumferential direction 102 of the compressor 130. In the illustrated embodiment, the solidity "$S_2$" may relate to the amount of metal present between the forward recess portions 196 in the circumferential direction 102. In one embodiment, the number of end-wall treatments 190 corresponding to the forward recess portions 196 per each blade passage 300 and solidity "$S_2$" of the end-wall treatment 190 defines the thickness "$T_1$" of the forward recess portion 196 of the end-wall treatment 190.

In accordance to the embodiments shown in FIGS. 8-19, a plurality of values related to various geometrical parameters of the forward and aft recess portions 196 and 198 are presented below. In one embodiment, the radial height "$H_1$" and "$H_2$" is in a range from about 5 percent to about 200 percent of an axial chord length "C" of the tip 192 of each blade 136 among the plurality of rotor and stator blades 136r, 136s. The axial lean "$\alpha$" of the forward recess portion 196 is in a range from about 0 degree to about 150 degrees relative to the surface 391 of the compressor end-wall 137. The axial lean "$\beta$" of the aft recess portion 198 is in a range from about 0 degree to about 180 degrees relative to the surface 391 of the compressor end-wall 137. The circumferential leans "$\theta_1$", "$\theta_2$" of the forward recess portion 196 and circumferential leans "$\mu_1$", "$\mu_2$" of the aft recess portion 198 are in a range from about 5 degrees to about 175 degrees relative to the surface 392 of the compressor end-wall 137. The aft and forward recess portions 198, 196 are inclined in a range from about −170 degrees to about 170 degrees (i.e. bend angle $\Phi$") relative to the axial direction 101 of the compressor 130. The intersection portion 212 is inclined in a range from about 30 degrees to about 150 degrees (i.e. bend lean angle "$\psi$") relative to at least one of the first and second axes 201 and 202. The plurality of end-wall treatments 190 per each blade passage 300 is in a range from about 0 to about 100. The aft recess portion 198 has an axial length "$L_2$" in a range from about 0 percent to about 100 percent of the axial chord length "C" of the tip 192 of each blade 136 among the plurality of rotor and stator blades 136r, 136s. The forward recess portion 196 has an axial length "$L_1$" in a range from about 0 percent to about 200 percent of the axial chord length "C" of the tip 192 of each blade 136 among the plurality of rotor and stator blades 136r, 136s. The plurality of end-wall treatments 190 has solidity "S" in a range from about 5 percent to about 95 percent of a pitch "P" of the each blade 136 among the plurality of rotor and stator blades 136r, 136s. Each end-wall treatment 190 includes a bend offset "G" in front of each blade 136 among the plurality of rotor and stator blades 136r, 136s and the bend offset "G" is in a range from about −100 percent to about 300 percent of the axial chord length "C" of the tip 192 of each blade 136 among the plurality of rotor and stator blades 136r, 136s.

In an embodiment, the pitch "P" between the mutually adjacent end-wall treatments 190 in the casing 140 may be different than the "P" between the mutually adjacent end-wall treatments 190 in the hub 138. Further, the pitch "P" of the end-wall treatments 190 formed in both the casing 140 and hub 138 may not match with the pitch between the mutually adjacent rotor blades 136r and stator blades 136s. In one or more embodiments, the various geometric features of the end-wall treatments 190 formed in the casing 140 may be different than the various geometric features of the end-wall treatments 190 formed in the hub 138.

Figure 20:
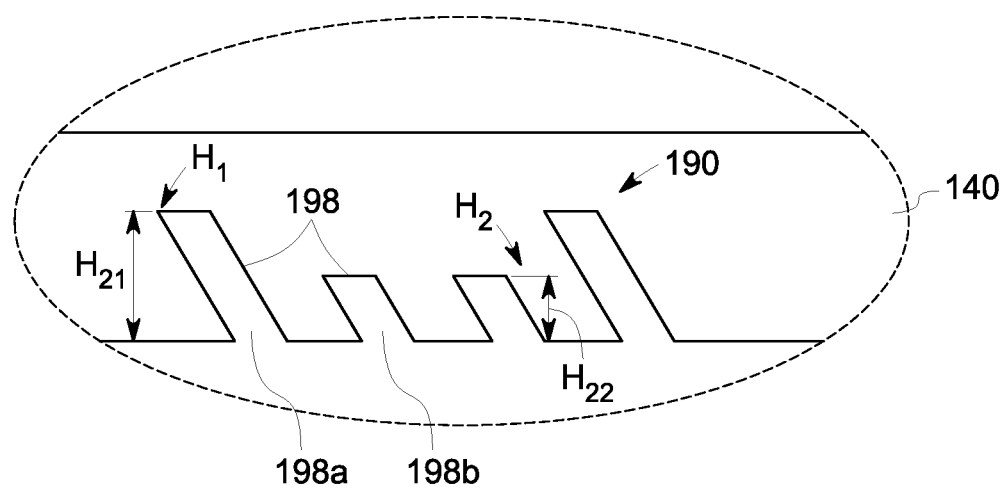
FIG. 20 is a schematic view of a plurality of end-wall treatments in an aft looking forward direction in accordance with one exemplary embodiment.

FIG. 20 is a schematic view of the plurality of end-wall treatments 190 in accordance with one exemplary embodiment. The schematic view may be taken along view 18-18 of FIG. 17 including the aft recess portion 198 of the end-wall treatment 190 embedded in the casing 140. Specifically, the schematic cross-sectional view of the plurality of aft recess portions 198 is an aft looking forward view along the axis (i.e. the longitudinal axis 105) of rotation 204. For clarity purpose the plurality of forward recess portions 196 is not shown in the illustration of FIG. 20 and such illustration should not be construed as a limitation of the present invention.

The plurality of aft recess portions 198 has the radial height "$H_2$" as shown in FIGS. 8 and 11. Further one or more aft recess portions 198 among the plurality of aft recess portions 198 may have a different radial height "$H_2$". In the illustrated embodiment, one aft recess portion 198a among the plurality of aft recess portions 198 has a radial height "$H_{21}$" and another aft recess portion 198b among the plurality of aft recess portions 198 has an radial height "$H_{22}$" different the radial height "$H_{21}$". Such variation in the height "$H_2$" may be defined along the axial direction 101 of the compressor 130. The variation in the radial height "$H_2$" among the plurality of aft recess portions 198 may help to effectively extract the leakage flows 188 (as shown in FIG. 2) around the tip 192 of each blade 136. Similarly, the plurality of forward recess portion 196 has the radial height "$H_1$" as shown in FIGS. 8 and 11. Further one or more forward recess portions 196 among the plurality of forward recess portions 196 may have a different radial height "$H_1$". Such variation in the height "$H_1$" may be defined along the axial direction 101 of the compressor 130. The variation in the radial height "$H_1$" in the plurality of forward recess portions 196 may help to control the portion 206 of the fluid flow 160 (as shown in FIGS. 3, 4 and 5) being recirculated into the gaps 210r and 210s (as shown in FIGS. 3, 4, and 5).

The embodiments disclosed in FIGS. 8-11, and 15-19, as illustrated, includes each end-wall treatment 190, in the form of the forward recess portion 196 joined to the aft recess portion 198 at an bend angle "$\Phi$". As illustrated, the aft recess portion 198 includes a geometric shape having an overall linear shape from the downstream wall 224 to the intersection portion 212 and between the sidewalls 309 and 311. The forward recess portion 196 also includes a geometric shape having an overall linear shape from the upstream wall 262 to the intersection portion 212 and between the sidewalls 308 and 310. Similar to the previously described embodiments, the forward recess portion 196 and the aft recess portion 198 may be optimized to provide specific solution for any application that desires an increase in stable operating range. Some of the aspects that may be optimized, include, but are not limited to: (i) the axial lean "$\alpha$" of the upstream wall 262 and the axial lean "$\beta$" of the downstream wall 224; (ii) the circumferential lean "$\theta_1$" of the upstream wall 308 and the circumferential lean "$\theta_2$" of the downstream wall 310 of the forward recess portion 196; (iii) the circumferential lean "$\mu_1$" of the upstream wall 309 and the circumferential lean "$\mu_2$" of the downstream wall 311 of the aft recess portion 198; (v) the radial height "$H_1$"

of the forward recess portion 196 and "H₂" of the aft recess portion 198, (vi) the bend offset "G"; (vii) the circumferential spacing/ pitches "P₁" and "P₂" between each end-wall treatment 190, (viii) a number of forward recess portions 196 and the number of aft recess portion 198; (ix) circumferential thicknesses "T₁" and "T₂" of the forward and aft recess portions 196 and 198; (x) axial lengths "L₁" and "L₂" of the forward and aft recess portions 196 and 198; (xi) bend angle "Φ" of the forward and aft recess portions 196 and 198 relative to the axial direction 101 of the compressor; (xii) bend lean angle "ψ" of the intersection portion 212 relative to the first and second axes 201 and 201; (xiii) an overall geometric cross-sectional profile of the aft recess portion 198 when viewed in a radial-axial plane; (xiv) any variation of the above parameters in the radial, axial and tangential direction.

Referring now to FIG. 21, is a schematic view of the plurality of end-wall treatments 190 in accordance with one exemplary embodiment. The schematic view may be taken along view 18-18 of FIG. 17 including the aft recess portion 198 of the end-wall treatment 190 embedded in the casing 140. Specifically, the schematic cross-sectional view of the plurality of aft recess portions 198 is an aft looking forward view along the axis (i.e. the longitudinal axis 105) of rotation 204. For clarity purpose the plurality of forward recess portions 196 is not shown in the illustration of FIG. 21 and such illustration should not be construed as a limitation of the present invention.

In the illustrated embodiment, the plurality of aft recess portions 198 includes a first aft recess portion 198a, a second aft recess portion 198b, and a third aft recess portion 198c. The first aft recess portion 198a has a first sidewall 309a and a second sidewall 311a. Similarly, the second aft recess portion 198b has a first sidewall 309b and a second sidewall 311b. The third aft recess portion 198c has a first sidewall 309c and a second sidewall 311c. The first aft recess portion 198a has an overall curvilinear shape from the first sidewall 309a to the second sidewall 311a. The second aft recess portion 198b has an overall triangular shape from the first sidewall 309b to the second sidewall 311b. The third aft recess portion 198c has an overall linear shape from the first sidewall 309c to the second sidewall 311c. Appropriate choice of curvature may minimize aerodynamic loss within the aft recess portion 198 and more particularly minimize energy dissipation near sidewalls 309 and 311 meeting the intersection portion 212 (as shown in FIG. 17). In another embodiment, the plurality of forward recess portion 196 may also have various overall shapes and/or profiles from the first sidewall 308 to the second sidewall 310 and such profiles may minimize aerodynamic loss within the forward recess 196 and more particularly minimize energy dissipation near sidewalls 308 and 310 meeting the intersection portion 212 (as shown in FIG. 17).

Figure 22:
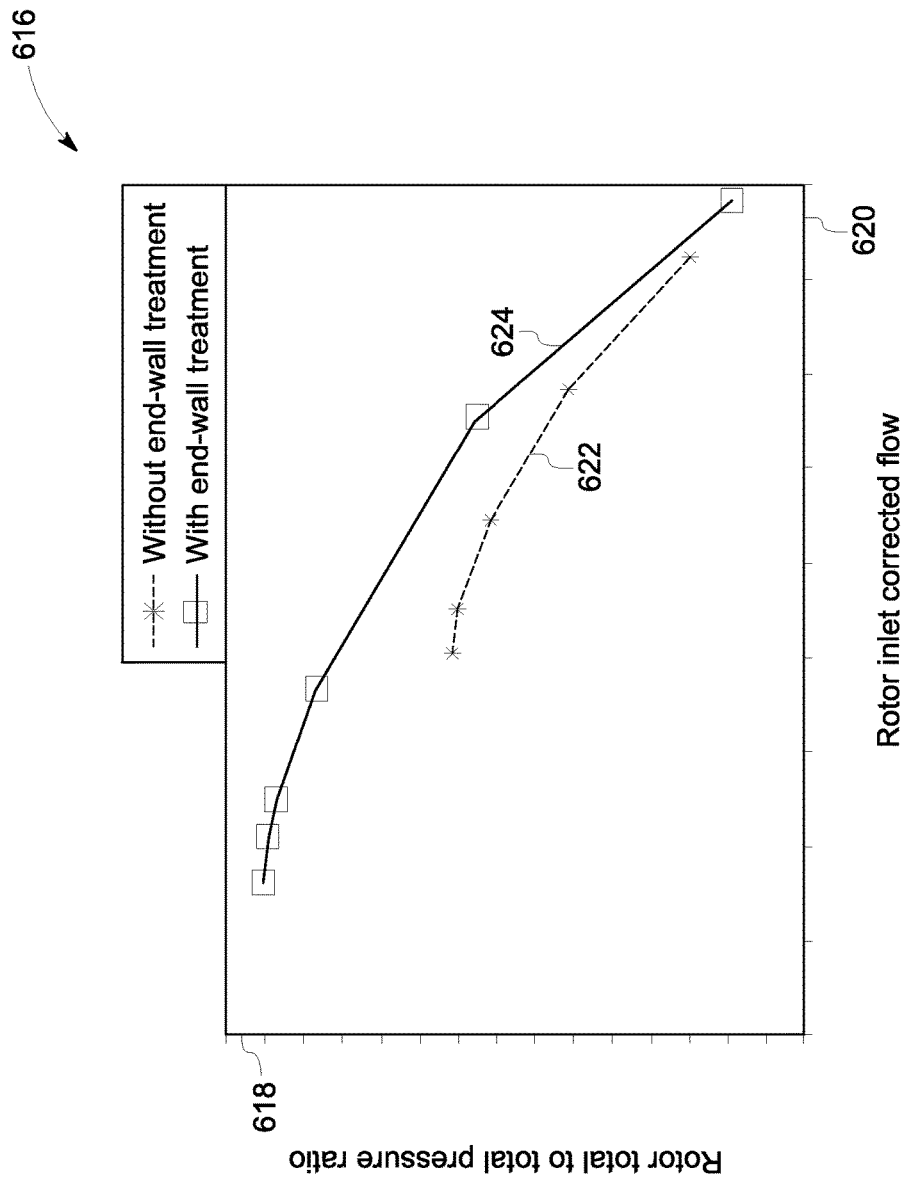
FIG. 22 is a graphical representation illustrating a benefit of a compressor including a plurality of end-wall treatments as disclosed in accordance with one or more exemplary embodiments.

Referring now to FIG. 22, illustrated in an exemplary graphical representation, generally referenced 616, is the benefit of the compressor 130 including the plurality of end-wall treatments 190 as disclosed herein, and more particularly when applied to a modern compressor, in accordance with an exemplary embodiment. More specifically, graph 616 illustrates the rotor total to total pressure ratios (plotted in axis 618) with rotor inlet corrected flow (plotted in axis 620) of the compressor without the end-wall treatment (plotted in line 622, in accordance with an embodiment shown in FIG. 2), and with the end-wall treatment 190 (plotted in line 624, in accordance with an embodiment described herein). As indicated by line 624, the rotor blades 136r is able to continuously provide a pressure rise at a lower mass flow rate when compared with the compressor that does not include end-wall treatment, as plotted at line 622. This extension in stable operating range is only representative and may be optimized to be specific to a desired application. Further, these results were obtained using simulation of the unsteady flow with computational fluid dynamics (CFD). Detailed investigation of the flow simulation results also confirms the primary flow mechanism. As previously indicated, the benefit in extending stable operating range and the impact on compressor efficiency depends on how the forward recess portion 196 and the aft recess portion 198 are designed relative to the tips 192r and 192s of the rotor and stator blades 136r and 136s respectively.

Accordingly, as disclosed herein and as illustrated in FIGS. 1, and 3-21, provided are various technological advantages and/or improvements over existing compressor treatments, and in particular the plurality of end-wall treatments 190 of the present invention provides an increase in stall margin, with minimal penalty on design-point efficiency of the compressor 130. The proposed forward recess portion 196 is disposed along the axial direction 101 of the compressor 130 and the aft recess portion 198 is inclined away from the axial direction 101 such that it has a directional component along the rotation 204 of the tip 192 of each blade 136, as disclosed herein, have the potential to provide higher stall margins and operability range of the compressor 130. Further, the forward recess portion 196 and the aft recess potion 198 may be optimized and adjusted for the application on which they are deployed, which helps in improving the stall margin, with minimal design-point efficiency penalty in the compressor 130.

Exemplary embodiments of an axial compressor having the end-wall treatment and method of controlling the leakage flow therein are described in detail above. Although the end-wall treatment have been described with reference to an axial compressor, the end-wall treatment as described above may be used in any compressor, including other types of engine apparatus that include a compressor, and particularly those in which an increase in stall margin is desired. Other applications will be apparent to those of skill in the art. Accordingly, the compressor end-wall treatment and method of controlling leakage flow and improving the stall margin as disclosed herein is not limited to use with the specified engine apparatus described herein. Moreover, the present disclosure is not limited to the embodiments of the axial compressor described in detail above. Rather, other variations of the compressor including end-wall treatment embodiments may be utilized within the spirit and scope of the claims.

While only certain features of embodiments have been illustrated and described herein, many modifications and changes will occur to those skilled in the art. It is, therefore, to be understood that the appended embodiments are intended to cover all such modifications and changes as falling within the spirit of the technology.

The invention claimed is:
1. A compressor comprising:
a compressor end-wall defining a flow passage, the compressor end-wall comprising a casing and a hub disposed concentrically about and coaxially along a longitudinal axis;
at least one of a rotor blade and a stator blade, wherein the rotor blade is coupled to the hub, extends between the hub and the casing, and defines a blade passage there between an adjacent rotor blade, wherein the stator blade is coupled to the casing, extends between the casing and the hub, and defines a blade passage there between an adjacent stator blade; and a plurality of end-wall treatments spaced apart from each other and formed in an interior surface of at least one of the casing and the hub, wherein each end-wall treatment faces a tip of the rotor blade or the stator blade, wherein each end-wall treatment comprises a forward recess portion extending along a first axis to maintain a fluid flow substantially straight through the forward recess portion, and an aft recess portion extending along a second axis different than the first axis to maintain the fluid flow substantially straight through the aft recess portion, wherein the aft recess portion is joined to the corresponding forward recess portion via an intersection portion which is inclined relative to at least one of the first axis, and the second axis, wherein at least one of the aft recess portion and the forward recess portion is bent from the intersection portion and inclined relative to an axial direction of the compressor, and wherein the aft and forward recess portions comprise an axial lean inclined relative to at least one of the axial direction of the compressor, the first axis, and the second axis, and a circumferential lean inclined relative to a circumferential direction of the compressor.

2. The compressor of claim 1, wherein the axial lean of the aft recess portion is in a range from about 0 degree to about 180 degrees relative to a surface of the compressor end-wall, and the axial lean of the forward recess portion is in a range from about 0 degree to about 150 degrees relative to the surface of the compressor end-wall.

3. The compressor of claim 1, wherein the circumferential lean of the aft and forward recess portions are in a range from about 5 degrees to about 175 degrees relative to a surface of the compressor end-wall.

4. The compressor of claim 1, wherein the aft and forward recess portions are inclined in a range from about −170 degrees to about 170 degrees.

5. The compressor of claim 1, wherein the intersection portion is inclined in a range from about 30 degrees to about 150 degrees.

6. The compressor of claim 1, wherein the plurality of end-wall treatments per each blade passage is in a range from about 0 to about 100.

7. The compressor of claim 1, wherein the aft and forward recess portions are defined circumferentially about the compressor end-wall.

8. The compressor of claim 1, wherein the aft and forward recess portions have a radial height in a range from about 5 percent to about 200 percent of an axial chord length of the tip of each blade among the plurality of rotor and stator blades.

9. The compressor of claim 1, wherein the aft recess portion has an axial length in a range from about 0 percent to about 100 percent of an axial chord length of the tip of each blade among the plurality of rotor and stator blades.

10. The compressor of claim 1, wherein the forward recess portion has an axial length in a range from about 0 percent to about 200 percent of an axial chord length of the tip of each blade among the plurality of rotor and stator blades.

11. The compressor of claim 1, wherein the plurality of end-wall treatments has a solidity in a range from about 5 percent to about 95 percent of a pitch of each blade among the plurality of rotor and stator blades.

12. The compressor of claim 1, wherein each end-wall treatment comprises a bend offset in front of each blade among the plurality of rotor and stator blades, wherein the bend offset is in a range from about −100 percent to about 300 percent of an axial chord length of the tip of each blade among the plurality of rotor and stator blades.

13. A method comprising:

introducing a fluid flow along a flow passage defined by a compressor end-wall of the compressor, wherein the compressor end-wall comprising a casing and a hub disposed concentrically about and coaxially along a longitudinal axis, wherein the compressor comprises at least one of a rotor blade and a stator blade, wherein the rotor blade is coupled to the hub, extends between the hub and the casing, and defines a blade passage there between an adjacent rotor blade, wherein the stator blade is coupled to the casing, extends between the casing and the hub, and defines a blade passage there between an adjacent stator blade;

extracting a portion of the fluid flow into an end-wall treatment among the plurality of end-wall treatments spaced apart from each other and formed in an interior surface of at least one of the casing and the hub, wherein each end-wall treatment faces a tip of the rotor blade or the stator blade, wherein each end-wall treatment comprises a forward recess portion extending along a first axis and an aft recess portion extending along a second axis different than the first axis, wherein the aft recess portion is joined to the corresponding forward recess portion via an intersection portion which is inclined relative to at least one of the first axis, and the second axis, wherein at least one of the aft recess portion and the forward recess portion is bent from the intersection portion and inclined relative to an axial direction of the compressor, and wherein the aft and forward recess portions comprise an axial lean inclined relative to at least one of the axial direction of the compressor, the first axis, and the second axis, and a circumferential lean inclined relative to a circumferential direction of the compressor; and flowing the portion of the fluid flow along the first axis to maintain a fluid flow substantially straight through the forward recess portion, and along the second axis to maintain the fluid flow substantially straight through the aft recess portion.

14. The method of claim 13, further comprising distributing at least one of a sub-portion of the fluid flow from the aft recess portion into the forward recess portion, and the sub-portion of the fluid flow from the forward recess portion into the aft recess portion.

15. The method of claim 14, further comprising recirculating the portion and the sub-portion of the fluid flow from the aft and forward recess portions into a gap formed between the tip of each blade among the plurality of rotor and stator blades, and each end-wall treatment.

16. An engine comprising:

a compressor;

a combustor; and a turbine, wherein the compressor, the combustor, and the turbine are configured in a downstream axial flow relationship, the compressor comprising:

a compressor end-wall defining a flow passage, the compressor end-wall comprising a casing and a hub disposed concentrically about and coaxially along a longitudinal axis;

at least one of a rotor blade and a stator blade, wherein the rotor blade is coupled to the hub, extends between the hub and the casing, and defines a blade passage there between an adjacent rotor blade, wherein of the stator blade is coupled to the casing, extends between the casing and the hub, and defines a blade passage there between an adjacent stator blade; and a plurality of end-wall treatments spaced apart from each other and formed in an interior surface of at least one of the casing and the hub, wherein each end-wall treatment faces a tip of the rotor blade or the stator blade, wherein each end-wall treatment comprises a forward recess portion extending along a first axis to maintain a fluid flow substantially straight through the forward recess portion, and an aft recess portion extending along a second axis different than the first axis to maintain the fluid flow substantially straight through the aft recess portion, wherein the aft recess portion is joined to the corresponding forward recess portion via an intersection portion which is inclined relative to at least one of the first axis, and the second axis, wherein at least one of the aft recess portion and the forward recess portion is bent from the intersection portion and inclined relative to an axial direction of the compressor, and wherein the aft and forward recess portions comprise an axial lean inclined relative to at least one of the axial direction of the compressor, the first axis, and the second axis, and a circumferential lean inclined relative to a circumferential direction of the compressor.

17. The engine of claim 16, wherein the axial lean of the aft recess portion is in a range from about 0 degree to about 180 degrees relative to a surface of the compressor end-wall, and the axial lean of the forward recess portion is in a range from about 0 degree to about 150 degrees relative to the surface of the compressor end-wall.

18. The engine of claim 16, wherein the circumferential lean of the aft and forward recess portions are in a range from about 5 degrees to about 175 degrees relative to a surface of the compressor end-wall.

19. The engine of claim 16, wherein the aft and forward recess portions are inclined in a range from about −170 degrees to about 170 degrees.

20. The engine of claim 16, wherein the intersection portion is inclined in a range from about 30 degrees to about 150 degrees.

21. The engine of claim 16, wherein the plurality of end-wall treatments per each blade passage is in a range from about 0 to about 100.

22. The engine of claim 16, wherein the aft and forward recess portions are defined circumferentially about the compressor end-wall.

23. The engine of claim 16, wherein the aft and forward recess portions have a radial height in a range from about 5 percent to about 200 percent of an axial chord length of the tip of each blade among the plurality of rotor and stator blades.

24. The engine of claim 16, wherein the aft recess portion has an axial length in a range from about 0 percent to about 100 percent of an axial chord length of the tip of each blade among the plurality of rotor and stator blades, and wherein the forward recess portion has an axial length in a range from about 0 percent to about 200 percent of the axial chord length of the tip of each blade among the plurality of rotor and stator blades.

25. The engine of claim 16, wherein the plurality of end-wall treatments has a solidity in a range from about 5 percent to about 95 percent of a pitch of each blade among the plurality of rotor and stator blades.

26. The engine of claim 16, wherein each end-wall treatment comprises a bend offset in front of each blade among the plurality of rotor and stator blades, wherein the bend offset is in a range from about −100 percent to about 300 percent of an axial chord length of the tip of each blade among the plurality of rotor and stator blades.

* * * * *